US009515760B2

(12) United States Patent
Phan Huy et al.

(10) Patent No.: US 9,515,760 B2
(45) Date of Patent: Dec. 6, 2016

(54) ESTABLISHING THE QUALITY INDICATOR OF A RADIO CHANNEL BY DECORRELATING RADIO CONDITIONS AND NETWORK ACTIVITY

(71) Applicant: Orange, Paris (FR)

(72) Inventors: Dinh Thuy Phan Huy, Paris (FR); Vincent Diascorn, Meudon (FR)

(73) Assignee: ORANGE, Paris (FR)

( * ) Notice: Subject to any disclaimer, the term of this patent is extended or adjusted under 35 U.S.C. 154(b) by 218 days.

(21) Appl. No.: 14/367,111

(22) PCT Filed: Nov. 29, 2012

(86) PCT No.: PCT/FR2012/052748
§ 371 (c)(1),
(2) Date: Jun. 19, 2014

(87) PCT Pub. No.: WO2013/093271
PCT Pub. Date: Jun. 27, 2013

(65) Prior Publication Data
US 2015/0071095 A1    Mar. 12, 2015

(30) Foreign Application Priority Data
Dec. 19, 2011   (FR) ..................................... 11 61957

(51) Int. Cl.
*H04J 11/00*   (2006.01)
*H04L 27/26*   (2006.01)
(Continued)

(52) U.S. Cl.
CPC .......... *H04J 11/0056* (2013.01); *H04J 11/005* (2013.01); *H04L 5/005* (2013.01);
(Continued)

(58) Field of Classification Search
None
See application file for complete search history.

(56) References Cited

U.S. PATENT DOCUMENTS

| 2005/0068884 | A1* | 3/2005 | Yoon | ...................... | H04L 5/0007 370/203 |
| 2009/0047969 | A1* | 2/2009 | Lee | ....................... | H04L 5/0048 455/446 |
| 2010/0020771 | A1* | 1/2010 | Ji | .......................... | H04L 1/0004 370/336 |

OTHER PUBLICATIONS

French Search Report and Written Opinion dated Aug. 16, 2012 for corresponding French Patent Application No. 11 61957 filed Dec. 19, 2011.

(Continued)

*Primary Examiner* — Chirag Shah
*Assistant Examiner* — Rina Pancholi
(74) *Attorney, Agent, or Firm* — David D. Brush; Westman, Champlin & Koehler, P.A.

(57) ABSTRACT

A method establishing a quality indicator of a radio transmission channel in a first cell of a cellular network using a plurality of orthogonal frequency-division multiplexed subcarriers for transmitting data. A first transmitter located in the first cell transmits a reference control signal including a total-load control signal modulating one or more of the orthogonal subcarriers, during one or more first symbol times dedicated to transmission of symbols other than data symbols, and a useful-load control signal modulating one or more orthogonal subcarriers during at least one second symbol time dedicated to transmission of data symbols. A transmitter located in an adjacent cell transmits an interfering control signal modulating, during the first symbol time(s). The quality indicator is determined according to a (Continued)

measured quality indicator of the channel under the useful load and a measured quality indicator of the channel under the total load.

21 Claims, 13 Drawing Sheets

(51) Int. Cl.
*H04W 24/08* (2009.01)
*H04L 5/00* (2006.01)
(52) U.S. Cl.
CPC .......... *H04L 5/0057* (2013.01); *H04L 27/261* (2013.01); *H04W 24/08* (2013.01); *H04L 5/0048* (2013.01)

(56) References Cited

OTHER PUBLICATIONS

International Search Report and Written Opinion dated Jan. 17, 2013 for corresponding International Patent Application No. PCT/FR2012/052748 filed Nov. 29, 2012.
Amir Farajidana et al.: "3GPP LTE Downlink System Performance", Global Telecommunications Conference, 2009. Globecom 2009, IEEE, IEEE, Piscataway, NJ, USA, Nov. 30, 2009, pp. 1-6, XP031645495.
Claudia Rosa et al.: "Performance Aspects of LTE Uplink with Variable Load and Bursty Data Traffic", 21st Annual IEEE International Symposium on Personal, Indoor and Mobile Radio Communications (PIMRC), 2010.

* cited by examiner

- Prior Art -

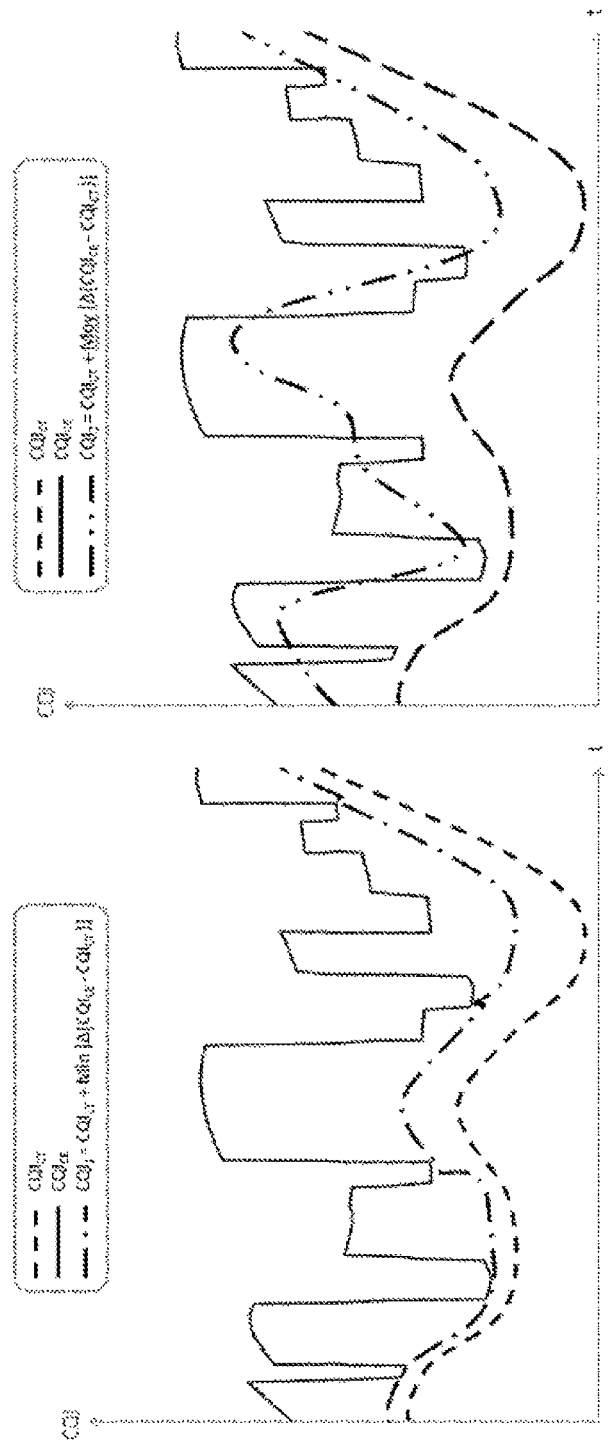

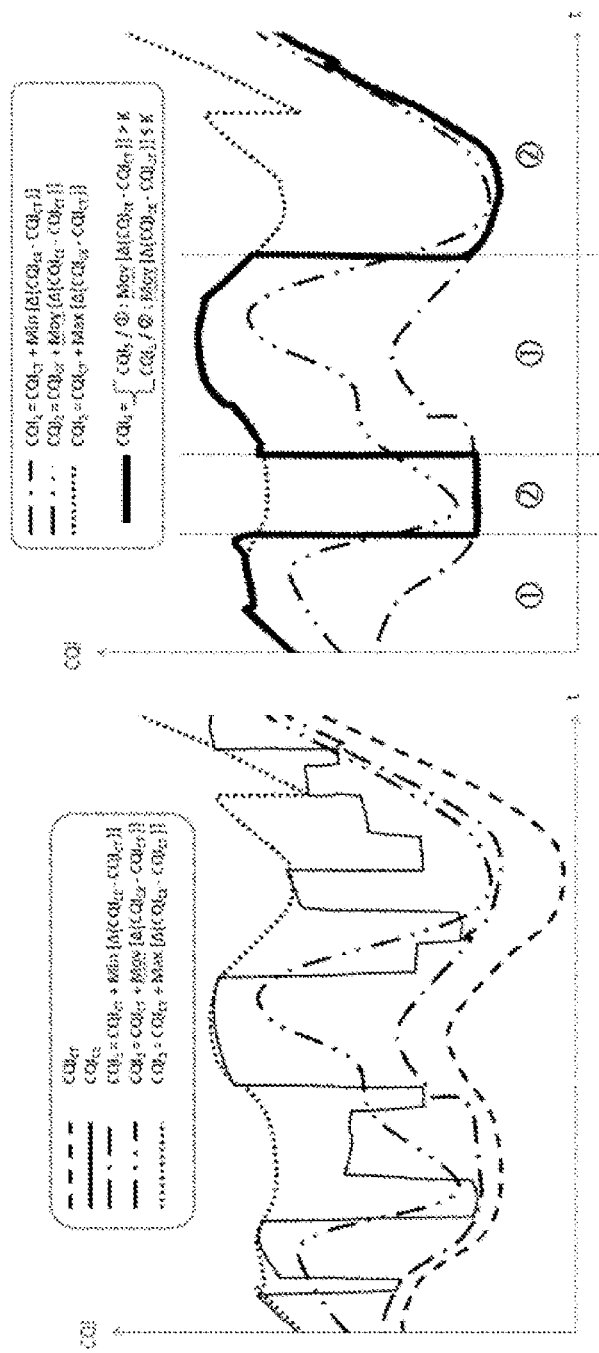

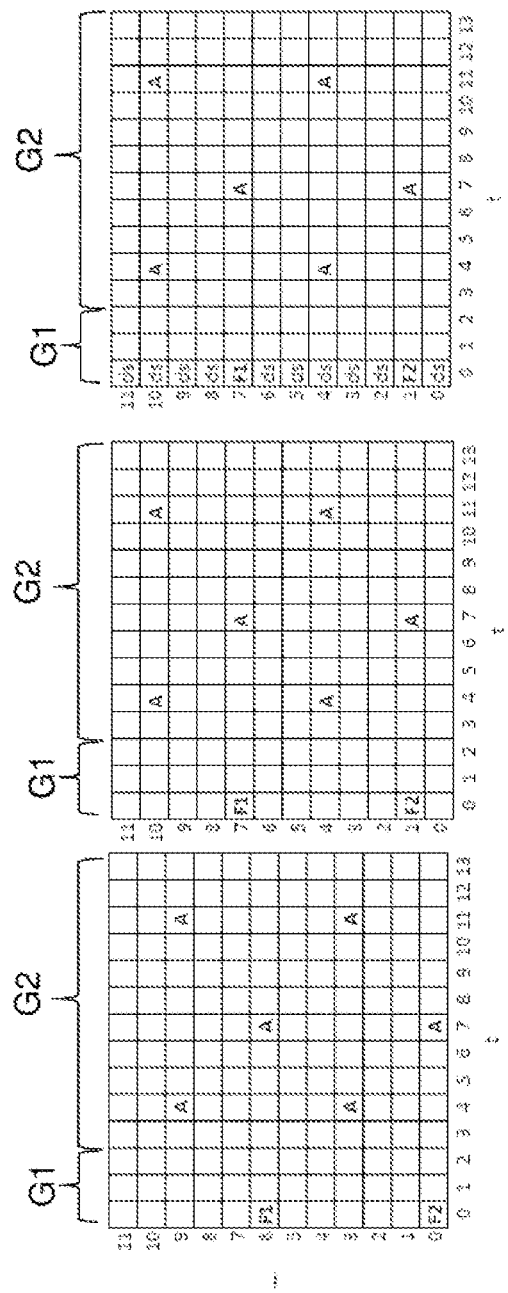

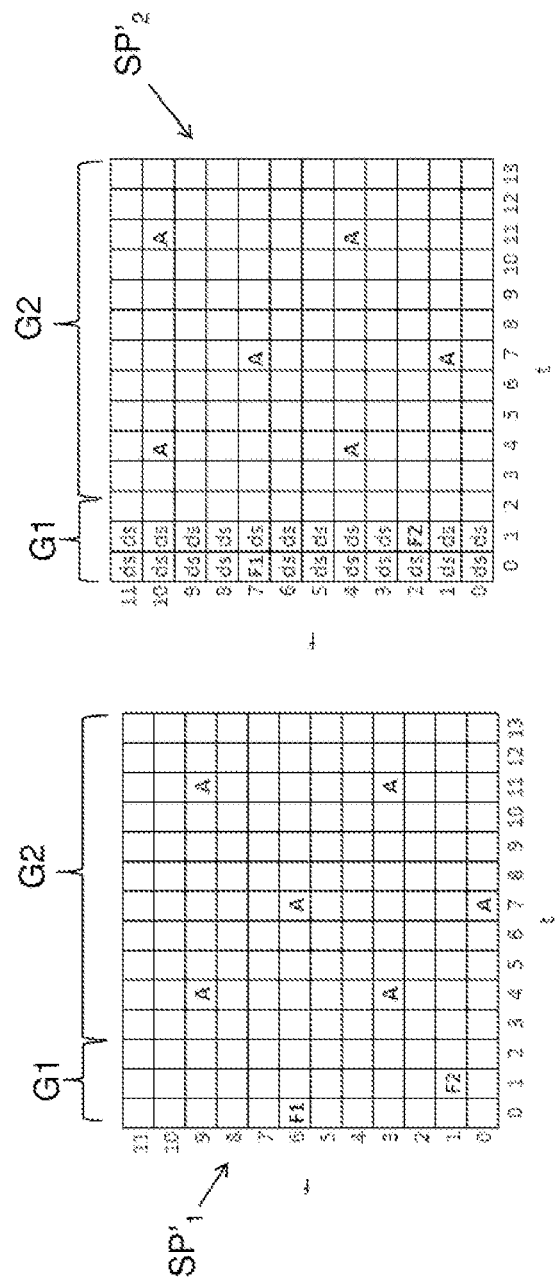

ESTABLISHING THE QUALITY INDICATOR OF A RADIO CHANNEL BY DECORRELATING RADIO CONDITIONS AND NETWORK ACTIVITY

CROSS-REFERENCE TO RELATED APPLICATIONS

This Application is a Section 371 National Stage Application of International Application No. PCT/FR2012052748, filed Nov. 29, 2012, which is incorporated by reference in its entirety and published as WO 2013093271 on Jun. 27, 2013, not in English.

FIELD OF THE DISCLOSURE

The field of the invention is that of wireless cellular telecommunication networks, and particularly cellular networks that use orthogonal frequency-division multiplexing (OFDM in English) for the transmission of data to mobile terminals.

BACKGROUND OF THE DISCLOSURE

In this type of cellular network, the mobile terminal of a user usually measures the quality of its radio communication channel by virtue of pilots that are sent by the base station on the downlink, before using the uplink to return a channel quality indicator, CQI in English, to this base station.

Such an indicator CQI is representative of the signal to interference and noise ratio (SINR) perceived by the mobile terminal at the moment of its measurement.

FIG. 1 illustrates the typical method for establishing such a quality indicator in a cellular network comprising, purely by way of illustration, three base stations $NB_1$ to $NB_3$ that are respectively situated in three adjacent cells of this network.

In the cells associated with the base stations $NB_2$ and $NB_3$, which are adjacent to the first cell, these base stations $NB_2$ and $NB_3$ transmit signals of a nature to interfere with the communication, in the first cell, between the first transmitting device $NB_1$ and a mobile terminal M.

In order to take account of this phenomenon of intercellular interference, the base station $NB_1$ transmits, in the first cell associated therewith, a pilot signal SP, the characteristics of which are known to the mobile terminal M, on the downlink of a radio communication channel so that this mobile terminal M is able to take a measurement for the signal to interference and noise ratio SINR (by comparison with the known characteristics) and to deduce the corresponding indicator CQI therefrom.

The mobile terminal M is then able to reciprocally transmit, on the uplink of the radio communication channel to be evaluated, the indicator CQI to the base station $NB_1$, so that the latter is aware of the transmission conditions on this channel, as measured by the mobile terminal M, and is able to adapt the transmission speed to these conditions.

This indicator CQI is used particularly by the base station $NB_1$ in order to predict the signal to interference and noise ratio SINR to which the mobile terminal M will be subjected in the future, and thus to select the speed suited to this signal to interference and noise ratio SINR as predicted. In particular, the higher the predicted signal to interference and noise ratio SINR, the higher the selected speed, and vice versa.

The efficiency of this type of mechanism, called "link adaptation" (or "adaptive modulation and coding" in English) is dependent on the relevance of the indicator CQI returned to the base station.

If this indicator CQI is underestimated, the speed selected by the base station is lower than the optimum speed, which causes a loss of efficiency.

If this indicator CQI is overestimated, on the other hand, then the speed selected by the base station is higher than the optimum speed, which can cause an increase in the number of data retransmissions, and therefore an increase in the transmission delay.

This is a particular problem in the case of a user using a service that is sporadic (that is to say in which data packets are sent sporadically) and realtime-based (hence with a large delay constraint), as is the case with services concerning the transmission of voice, streaming or video games in a network.

The reason is that, when such a user, called "target user", is in a cell of a cellular network, it is possible that another user, called "interfering user", is likewise using a sporadic service in a cell that is adjacent to this cell, which can create sporadic interference that is not necessarily reflected by the indicator CQI returned to the base station of the cell of the target user.

In fact, in such a situation of sporadic interference, the returned indicator CQI can then represent a signal to interference and noise ratio SINR that differs enormously from the signal to interference and noise ratio SINR to which the data transmission is effectively subject.

Two scenarios may then arise:
 in a first case, the returned indicator CQI proves to be too optimistic: if, at the moment of measurement of CQI by the terminal of the target user, the interfering cells are inactive, and they become active at the moment of the transmission of data, the returned indicator CQI will be too high in relation to the real situation, and therefore the speed used by the base station will be too high, which gives rise to a large number of retransmissions that greatly degrade the quality of the real time service of the target user.
 in a second case, the returned indicator CQI proves to be too pessimistic: if, at the moment at which the terminal of the target user takes its CQI measurement, the interfering cells are active and they become inactive at the moment of the transmission of data, then the returned indicator CQI will be too low, and the speed selected by the base station will be lower than the optimum speed. The capacity of the cell (in terms of number of users supported) will then be reduced.

This phenomenon is usually denoted by the term "CQI mismatch" in English and has been observed and measured in "3GPP LTE Downlink System Performance", Farajidana et al., Global Telecommunications Conference, GLOBECOM 2009, where the notion of sporadic interfering user is denoted by the term "partial loading".

It will be noted that this phenomenon of CQI mismatch can likewise exist even when the interfering traffic in the adjacent cells is not sporadic. By way of example, the CQI mismatch can be caused by a "flash light" effect corresponding to the situation in which an adjacent cell, although transmitting continuously (i.e. at "full loading"), saturates and greatly interferes, sporadically, with the target users, on account of a beam focusing process ("beam forming").

As the CQI mismatch mainly affects the target users having a non-negligible interference to noise ratio, the users at the edge of a cell are most affected by this CQI mismatch.

A certain number of techniques have been developed in order to attempt to resolve this problem of CQI mismatch:

The base station can apply a fixed margin to the indicator CQI reported by the mobile terminal. The base station therefore uses a pessimistic CQI at the input of its link adaptation mechanism, so as to be robust toward interference variations. This technique has the disadvantage of applying the same margin to all mobiles, whatever their characteristic, and is therefore found to be less than optimum.

The base station can average several indicators CQI reported by the mobile terminal. The base station then uses an average indicator CQI at the input of its link adaptation mechanism so as to be robust toward interference variations. This technique continues to be less than optimum, especially insofar as the problem of optimizing the averaging window, per cell, is difficult to resolve.

It has been envisaged to resort to interference cancellation methods, which prove to be extremely complex, however, because, upon the reception of data, the mobile terminal needs to be capable of jointly demodulating the useful signal and the interfering signal in order to reject the interfering signal. This complexity is proportional to the number of interfering elements that need to be rejected.

It is likewise possible to use a technique in which all cells transmit all the time, and possibly padding bits in order to create stable interference. Such a technique is less than optimum because energy is needlessly expended for transmitting bits (padding) without meaning (padding), it is all the less optimum when the network has a low level of loading.

It is possible to resort to techniques of interference coordination between cells (ICIC), which likewise prove to be very complex in terms of planning, however, and do not prevent the persistence of overlap areas bringing about a reduction in the capacity of the cell.

It has likewise been envisaged to place an attenuator in the mobile terminal, directly downstream of the reception antenna and upstream of the analog/digital signal process chain. This attenuator attenuates the received signal before the noise owing to the analog/digital conversion is added. With a good attenuator, the interference becomes negligible in the face of the noise, and the system becomes less sensitive to interference variations.

However, this solution has the disadvantage of causing attenuation of the useful signal received by the mobile terminal, which therefore systematically loses capacity and coverage. Moreover, the performance of the attenuator is dependent on the mobile manufacturers and therefore cannot be guaranteed.

Finally, a link adaptation technique as described in the article "Performance aspects of LTE uplink with variable load and bursty data traffic," Rosa C. et al., Personal Indoor and Mobile Radio Communications (PIMRC), 2010, can be used.

In this technique, the base station applies an offset to the CQI at the input of the link adaptation mechanism. The offset is controlled by a loop. If the base station receives a "NACK" message for a packet received by the mobile, the base station applies a reduced offset, and if it receives an "ACK" message, it applies an increased offset, the relationship between the steps of increasing and reducing the offset being dependent on the target "Block Error Rate" ratio.

This technique has the disadvantage that the base station can play with the offset only when data are transmitted. In point of fact, for a sporadic real-time service, the opportunities for data transmission are not very frequent. The BLER control loop therefore has difficulties converging.

SUMMARY

An exemplary embodiment of the invention proposes a method for establishing a quality indicator for a radio transmission channel in a first cell of a cellular network using a plurality of frequency-division-multiplexed orthogonal subcarriers for transmitting data, the method comprising:

the transmission, by a first transmitting device situated in the first cell, of a reference pilot signal comprising a total load pilot signal modulating at least one of the orthogonal subcarriers, during at least a first symbol time dedicated to the transmission of symbols other than data symbols, and an effective load pilot signal modulating at least one of the orthogonal subcarriers during at least one second symbol time dedicated to the transmission of data symbols;

for each cell adjacent to the first cell in the cellular network, the transmission, by a transmitting device situated in said adjacent cell, of an interfering pilot signal modulating, during the at least one first symbol time, during which the total load pilot signal modulates at least one of the subcarriers, this at least one subcarrier modulated by the total load pilot signal;

the measurement, by a receiving device situated in the first cell, of a quality indicator for the channel at total load by means of the total load pilot signal and of a quality indicator for the channel at effective load by means of the effective load pilot signal; and the determination of the quality indicator for the radio transmission channel from the quality indicator for the channel at effective load and the quality indicator for the channel at total load.

In a particular embodiment, the total load pilot signal comprises at least two total load pilot symbols respectively modulating at least two subcarriers during at least one first symbol time dedicated to the transmission of symbols other than data symbols or one subcarrier during at least two first symbol times dedicated to the transmission of symbols other than data symbols, and the interfering pilot signal comprises a plurality of interfering pilot symbols among which at least two interfering pilot symbols respectively modulate, for each of the total load pilot symbols, the subcarrier modulated by said total load pilot symbol during the first symbol time in which said subcarrier is modulated by said total load pilot symbol.

According to an advantageous aspect of the invention, the interfering pilot signal does not modulate, during the at least one second symbol time during which the effective load pilot signal modulates at least one of said subcarriers, this at least one subcarrier modulated by the effective load pilot signal.

In a particular embodiment, the effective load pilot signal comprises at least two effective load pilot symbols respectively modulating at least two subcarriers during at least one second symbol time dedicated to the transmission of data symbols or one subcarrier during at least two second symbol times dedicated to the transmission of data symbols, and the interfering pilot signal does not contain a symbol modulating, during the at least one second symbol time during which an effective load pilot symbol modulates one of the subcarriers, this subcarrier modulated by the effective load pilot symbol.

According to a particular embodiment in which the pilot symbols of the reference pilot signal are arranged according to a first predetermined pattern in a two-dimensional time/frequency block, in each of said adjacent cells: the interfering pilot signal comprises a plurality of pilot symbols arranged according to said predetermined pattern and frequency-shifted in relation to the pilot symbols of the reference pilot signal and the interfering pilot signal moreover comprises a plurality of complementary pilot symbols respectively modulating, during each first symbol time during which a total load pilot symbol modulates a subcarrier, all of the subcarriers, among the plurality of orthogonal subcarriers, that are not modulated by any symbol.

In a particular embodiment, the determination of the quality indicator for the channel comprises the calculation of the minimum value, over a time window, of the difference function between the quality indicator for the channel at effective load and the quality indicator for the channel at total load, the quality indicator for the channel being determined as being the sum of the quality indicator for the channel at total load and said minimum value.

In another particular embodiment, the determination of the quality indicator for the channel comprises the calculation of the mean value, over a time window, of the difference function between the quality indicator for the channel at effective load and the quality indicator for the channel at total load, the quality indicator for the channel being determined as being the sum of the quality indicator for the channel at total load and said mean value.

In another particular embodiment, the determination of the quality indicator comprises the calculation of the minimum value, of the mean value and of the maximum value, over a time window, of the difference function between the quality indicator for the channel at effective load, the quality indicator for the channel is determined as being the sum of the quality indicator for the channel at total load and a second variable, said second variable being chosen as being equal to said minimum value or said maximum value on the basis of the comparison of the mean value with a threshold.

According to an embodiment in which the determination of the quality indicator for the radio transmission channel is carried out in the first transmitting device, the method moreover comprises the transmission of the quality indicator for the channel at total load and of the quality indicator for the channel at effective load from the receiving device to the first transmitting device.

According to another embodiment in which the determination of the quality indicator for the radio transmission channel is carried out in the receiving device, the method moreover comprises the transmission of the quality indicator from the receiving device to the first transmitting device.

In a particular embodiment, the transmitting devices of the first cell and of the adjacent cells are base stations and the receiving device is a mobile terminal.

The invention moreover proposes a computer program comprising instructions for the execution of the steps of the method for determining the quality indicator above when said program is executed by a processing module of a transmitting device or of a receiving device. Such a computer program must be considered to be a product within the scope of protection that is sought by the present patent application.

The invention moreover proposes a base station for establishing a quality indicator for a radio transmission channel with at least one mobile terminal, the base station being capable of transmitting data by means of a plurality of frequency-division-multiplexed orthogonal subcarriers and comprising a transmitting module configured to transmit, to the mobile terminal, a reference pilot signal comprising a total load pilot signal modulating at least one of said orthogonal subcarriers, during at least one first symbol time dedicated to the transmission of symbols other than data symbols, and an effective load pilot signal modulating at least one of said orthogonal subcarriers during at least one second symbol time dedicated to the transmission of data symbols and the total load pilot signal and effective load pilot signal being capable of being used by the mobile terminal to respectively measure a quality indicator at total load and a quality indicator at effective load that are capable of being used to determine the quality indicator.

In a particular embodiment, this base station moreover comprises a reception module capable of receiving the quality indicator at total load, and the quality indicator at effective load that are measured by the mobile terminal and a processing module configured to determine the quality indicator by means of the quality indicator at effective load and the quality indicator at total load.

The invention also proposes a mobile terminal for establishing a quality indicator for a radio transmission channel with a base station that is capable of transmitting data by means of a plurality of frequency-division-multiplexed orthogonal subcarriers and comprising a receiving module that is capable of receiving, from said base station, a reference pilot signal comprising a total load pilot signal modulating at least one of said orthogonal subcarriers, during at least one first symbol time dedicated to the transmission of symbols other than data symbols, and an effective load pilot signal modulating at least one of said orthogonal subcarriers during at least one second symbol time dedicated to the transmission of data symbols, and also a processing module configured to measure a quality indicator at total load by means of the total load pilot signal and a quality indicator at effective load by means of the effective load pilot signal, the quality indicator at effective load and the quality indicator at total load being capable of being used to determine the quality indicator.

In a particular embodiment of this terminal, the processing module is moreover configured to determine the quality indicator by means of the quality indicator at effective load and the quality indicator at total load, the mobile terminal moreover comprising a transmission module configured to transmit the quality indicator to the base station.

Finally, the present invention proposes a cellular network in which a plurality of frequency-division-multiplexed orthogonal subcarriers are used to transmit data, the cellular network comprising at least one first base station as described above, at least one second base station, situated in a cell that is adjacent to the cell in which the first base station is situated, the second base station transmitting an interfering pilot signal modulating, during at least one first symbol time during which the total load pilot signal modulates at least one of said subcarriers, said at least one subcarrier modulated by the total load pilot signal.

BRIEF DESCRIPTION OF THE DRAWINGS

Other features and advantages will emerge upon reading the description and the figures in which, besides FIG. 1, which has already been mentioned in relation to the prior art:

FIGS. 3A to 3E illustrate the step of determination of a quality indicator CQI, from a quality indicator at total load $CQI_{CT}$ and of a quality indicator at effective load $CQI_{CE}$, according to various embodiments of the present invention;

FIGS. 6A to 6C illustrate a reference pilot signal according to the principle of the present invention, as transmitted by a first transmitting device situated in a first cell of a cellular network, represented according to a two-dimensional time and frequency block in various situations;

FIGS. 7A to 7C illustrate a reference pilot signal and an interfering pilot signal as transmitted by two adjacent cells of a cellular network in a particular embodiment of the present invention; and FIGS. 8A and 8B illustrate a reference pilot signal and an interfering pilot signal as transmitted by two adjacent cells of a cellular network in another particular embodiment of the present invention.

DETAILED DESCRIPTION OF ILLUSTRATIVE EMBODIMENTS

Figure 2:
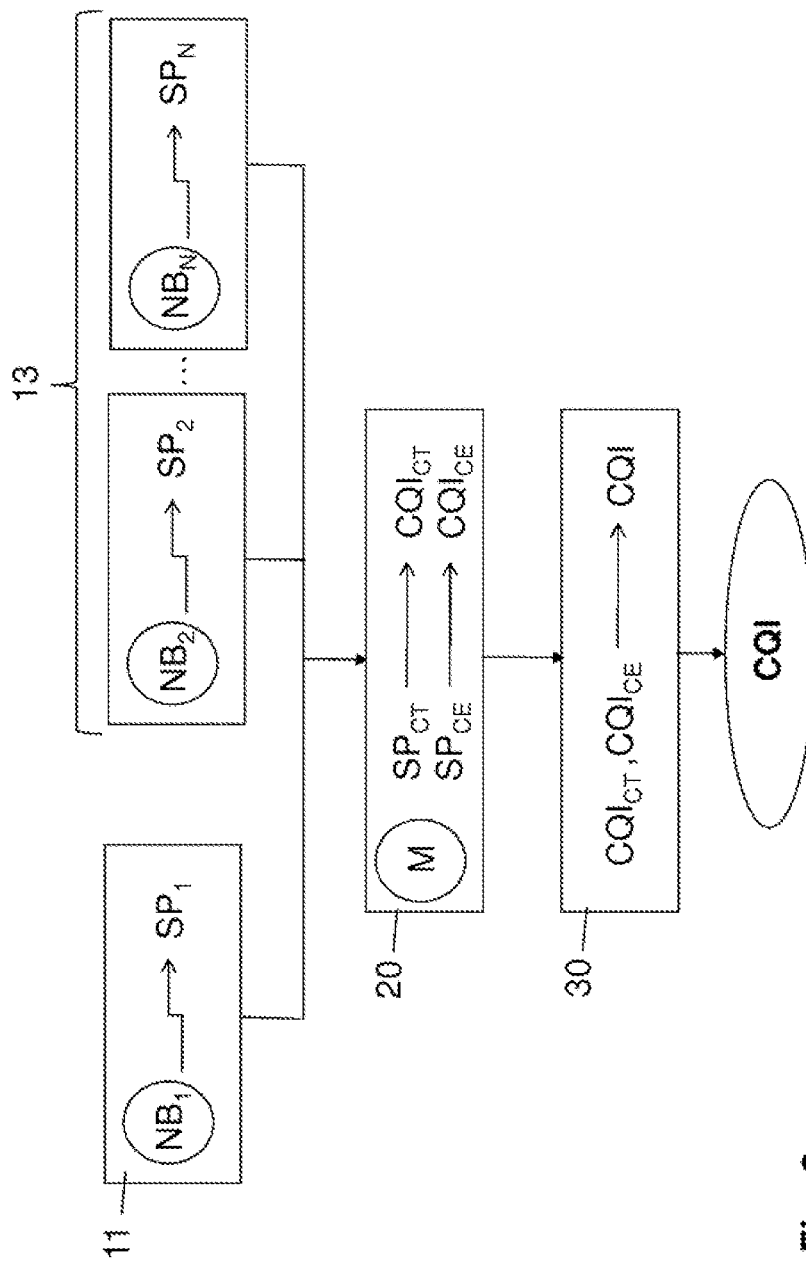
FIG. 2 illustrates the steps for a method for establishing a quality indicator CQI according to the principle of the present invention.

Reference is now made to FIG. 2, which illustrates the steps of a method for establishing a quality indicator CQI for the radio transmission channel according to the present invention.

Figure 1:
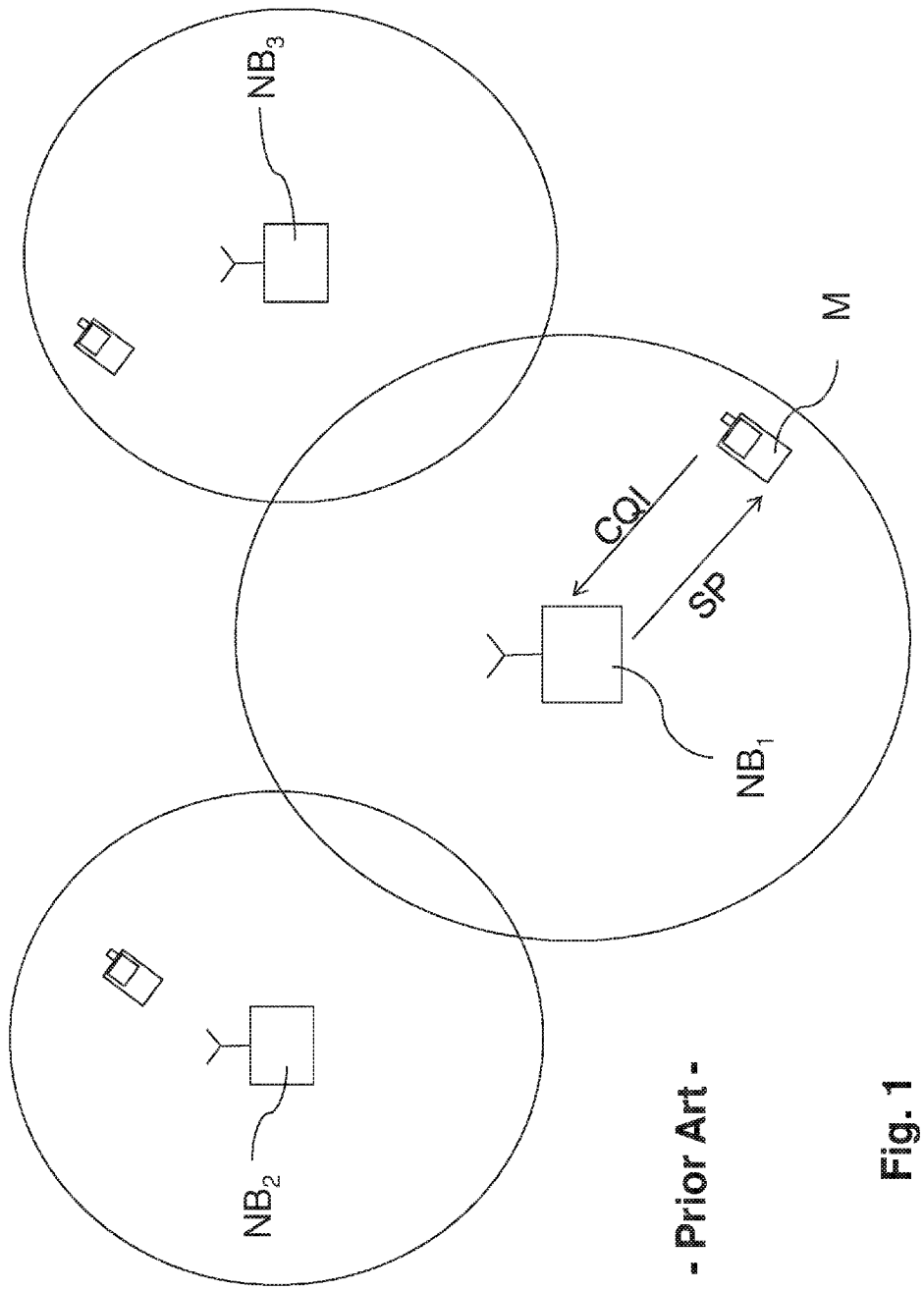

In particular, this method is implemented in a cellular network, similar to the cellular network illustrated in FIG. 1, and using a set of L subcarriers $f_0, \ldots, f_{L-1}$ for the transmission of data, notably on the downlink, according to the orthogonal frequency-division-multiplexing technique (OFDM for Orthogonal Frequency Division Multiplexing in English).

This cellular network has a certain number of cells among which there is a first cell that contains a first transmitting device $NB_1$ and a receiving device M communicating on a radio communication channel, for example in FDD (for Frequency Division Duplex) mode, that is to say for a first frequency dedicated to the downlink and a second frequency dedicated to the uplink.

The first transmitting device $NB_1$ is typically a base station, for example an "e-Node B" when the cellular network is of 3GPP LTE type, having a transmitting antenna that is capable of transmitting signals transmitted on the radio communication channel.

The receiving device M is typically a mobile terminal such as a mobile telephone, a smart phone or a portable computer, having a receiving antenna that is capable of receiving signals transmitted on the radio communication channel.

This first cell is surrounded by a certain number of adjacent cells. FIG. 1 more particularly illustrates two cells adjacent to the first cell in order to provide a simple illustration of the inventive principle, but the invention applies with any number of adjacent cells that contain a transmitting device transmitting a signal that can interfere with signals transmitted on the radio channel used in the first cell.

The second cell adjacent to the first cell notably contains a second transmitting device $NB_2$, the transmitted signals from which are of a nature to interfere with the communication, in the first cell, between the first transmitting device NB1 and the receiving device M.

In the method according to the principle of the present invention, the first transmitting device $NB_1$ transmits (step 11) a reference pilot signal $SP_1$ in the first cell, which is associated therewith.

This reference pilot signal $SP_1$ first comprises a total load pilot signal $SP_{CT}$ modulating at least one subcarrier from all of the orthogonal subcarriers during at least one first symbol time belonging to a first interval of symbol times $[t_{11};t_{12}]$ that is dedicated to the transmission of symbols other than data symbols. This first interval of symbol times $[t_{11};t_{12}]$ is not necessarily at the start of a data frame.

The function of the total load pilot signal $SP_{CT}$ is to allow the measurement of a first quality indicator, called "quality indicator at total load" and denoted by $CQI_{CT}$, reflecting the total load attained when all cells adjacent to the first cell transmit data.

In an advantageous embodiment, the total load pilot signal $SP_{CT}$ comprises a plurality of total load pilot symbols, denoted by F1 ..., Fi (where i≥2) below. Each total load pilot symbol Fi modulates, during a symbol time $\tau_{1,i}$ belonging to the first interval $[t_{11};t_{12}]$, a subcarrier $f_i$ among the L orthogonal subcarriers used in the cellular network.

These total load pilot symbols Fi are notably arranged among one another so as not to modulate one and the same subcarrier during one and the same symbol time.

Thus, by taking the more restrictive example in which the total load pilot signal $SP_{CT}$ comprises only two total load pilot symbols F1 and F2, these symbols F1 and F2 can respectively modulate two separate subcarriers $f_1,f_2$ (where $f_1 \neq f_2$) during two separate symbol times $\tau_{1,1}$ and $\tau_{1,2}$ (where $\tau_{1,1} \neq \tau_{1,2}$), respectively modulate two separate subcarriers $f_1,f_2$ (where $f_1 \neq f_2$) during one and the same symbol time $\tau_{1,1}$ (where $\tau_{1,1} = \tau_{1,2}$) or else modulate the same subcarrier $f_1$ (where $f_1 = f_2$) respectively during two separate symbol times $\tau_{1,1}$ and $\tau_{1,2}$ (where $T_{1,1}$ $\tau_{1,2}$). On the other hand, these symbols F1 and F2 cannot modulate the same subcarrier $f_1$ (where $f_1 = f_2$) during the same symbol time (where $\tau_{1,1} = \tau_{1,2}$).

Thus, the fact that there are at least two separate total load pilot symbols F1 and F2 in a time/frequency map makes it a simple matter to estimate the power of the useful signal and the power of the noise separately, and therefore to deduce therefrom the signal to interference and noise ratio $SINR_{CT}$ during the first interval of symbol times $[t_{11};t_{12}]$ using techniques that are known to a person skilled in the art. Of course, the greater the number of total load pilot symbols Fi the more precise the measurement of this ratio $SINR_{CT}$.

The reference pilot signal $SP_1$ moreover comprises an effective load pilot signal $SP_{CE}$ modulating at least one subcarrier from all of the orthogonal subcarriers during at least one second symbol time belonging to a second interval of symbol times $[t_{21};t_{22}]$ dedicated to the transmission of data symbols.

The function of this effective load pilot signal $SP_{CE}$ is to allow the measurement of a second quality indicator, called "quality indicator at effective load" and denoted by $CQI_{CE}$, reflecting the effective load due to the transmission of data in the adjacent cells.

In an advantageous embodiment, the effective load pilot signal $SP_{CE}$ comprises a plurality of effective load pilot symbols, denoted by A1, . . . , Aj (where j≥2). Each effective load pilot symbol Aj modulates, during a symbol time $\tau_{2,j}$ belonging to the second interval of symbol times $[t_{21};t_{22}]$, a subcarrier $f_j$ among the L orthogonal subcarriers used in the cellular network.

In a similar manner to the pilot symbols Fi mentioned previously, these effective load pilot symbols Aj are arranged among one another so as not to modulate the same subcarrier during one and the same symbol time, the reason for this being to allow the deduction of the signal to interference and noise ratio $SINR_{CE}$ during the second interval of symbol times $[t_{21};t_{22}]$ using techniques that are known to a person skilled in the art, it being understood that the greater the number of effective load pilot symbols Aj the more efficient the measurement of this ratio $SINR_{CE}$.

Furthermore, in each of the other cells adjacent to the first cell in the cellular network, a transmitting device transmits an interfering pilot signal (step 13). Thus, in the network illustrated in FIG. 1, the transmitting device $NB_2$ transmits an interfering pilot signal $SP_2$ in the second cell and the transmitting device $NB_3$ transmits an interfering pilot signal $SP_3$ in the third cell.

Each (of the) interfering pilot signal(s) modulates the same subcarrier(s) as the one that is modulated by the total load pilot signal $SP_{CT}$ of the reference pilot signal SP transmitted by the device, this occurring during the same symbol time(s) during which this modulation by the total load pilot signal $SP_{CT}$ takes place.

In other words, in a representation according to a two-dimensional time and frequency block, each interfering pilot signal $SP_2$, $SP_3$, . . . comprises interfering symbols placed in the same time/frequency position $(f_i;\tau_{1,1})$ as the total load pilot symbol(s) Fi of the total load pilot signal $SP_{CT}$.

To do this, the interfering pilot signal $SP_2$ comprises, for each total load pilot symbol Fi belonging to the total load pilot signal $SP_{CT}$, an interfering pilot symbol Fi' modulating the same subcarrier $f_i$ as the symbol Fi, during the same symbol time $\tau_{1,i}$.

This makes it possible to guarantee that, during this first interval of symbol times $[t_{11},t_{12}]$, all of the adjacent cells interfere, on the same subcarriers $f_i$, and during the same symbol times $\tau_{1,i}$, with the total load pilot symbols Fi of the total load pilot signal $SP_{CT}$.

On the contrary, the interfering pilot signal from the adjacent cells is advantageously arranged so as not to contain an interfering symbol modulating one and the same subcarrier, during one and the same symbol time, as an effective load pilot symbol Aj of the effective load pilot signal $SP_{CE}$.

In other words, still in the representation according to a two-dimensional time and frequency block, each interfering pilot signal $SP_2$, $SP_3$, . . . does not comprise an interfering pilot symbol placed in the same position $(f_j;\tau_2)$ as an effective load pilot symbol Aj of the effective load pilot signal $SP_{CE}$. This is the case for all effective load pilot symbols A1, . . . , Aj that are present in the effective load pilot signal $SP_{CE}$.

This makes it possible to ensure that no pilot symbol of an interfering signal interferes with the effective load pilot symbols Aj, which can therefore be interfered with only by data symbols, which makes it possible to obtain a measurement of the ratio $SINR_{CE}$ that is as precise as possible.

Next comes the measurement (step 20), by the receiving device M situated in the first cell, of the quality indicator at total load $CQI_{CT}$ and of the quality indicator at effective load $CQI_{CE}$.

In particular, the quality indicator at total load $CQI_{CT}$ is measured by means of the total load pilot symbols Fi of the total load pilot signal $SP_{CT}$, by measuring the signal to interference and noise ratio $SINR_{CT}$ associated with all of the total load pilot symbols Fi of this pilot signal $SP_{CT}$ and by deducing the quality indicator that corresponds to this signal to interference and noise ratio $SINR_{CT}$, in a similar manner to what is done for a traditional channel quality indicator CQI.

Equally, the quality indicator for the channel at effective load $CQI_{CE}$ is measured by means of the effective load pilot symbols Aj of the effective load pilot signal $SP_{CE}$, by measuring the signal to interference and noise ratio $SINR_{CE}$ associated with all of the effective load pilot symbols Aj of this signal $SP_{CE}$ and by deducing the quality indicator corresponding to this signal to interference and noise ratio $SINR_{CE}$, in a similar manner to what is done for a traditional channel quality indicator CQI.

Once the quality indicators $CQI_{CT}$ and $CQI_{CE}$ have been measured, there then follows the determination (step 30) of the quality indicator CQI for the radio transmission channel, from these quality indicators $CQI_{CT}$ and $CQI_{CE}$.

This step 30 of determination of the quality indicator CQI, from a quality indicator at total load $CQI_{CT}$ and a quality indicator at effective load $CQI_{CE}$, can be carried out according to various embodiments that are illustrated in FIGS. 3A to 3E.

Figure 3A:
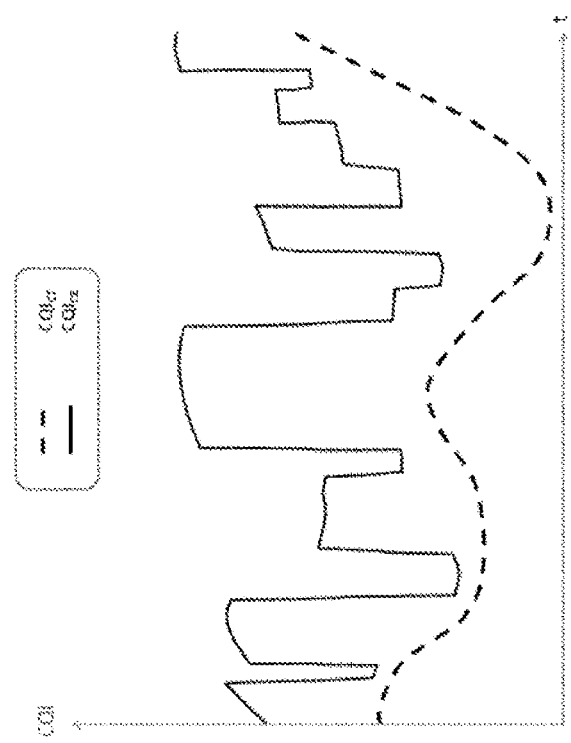

In order to obtain a good understanding of how the quality indicator for the channel CQI is obtained from the quality indicators $CQI_{CT}$ and $CQI_{CE}$, reference is first of all made to FIG. 3A which illustrates the respective curves for these quality indicators $CQI_{CT}$ and $CQI_{CE}$, measured over a certain period of time.

These curves are obtained by performing step 20 of measurement of these quality indicators regularly, for example with a multiple period for the frame of the system. Thus, if the transmitted data frames have a duration of 1 ms, step 20 of measurement of the indicators $CQI_{CT}$ and $CQI_{CE}$ can be carried out every k milliseconds, k being an integer greater than 1.

In this FIG. 3A, the curve for the quality indicator at total load $CQI_{CT}$ directly reflects the development in the radio conditions affecting the receiving device M, independently of the activity on the network.

For its part, the curve for the quality indicator at effective load $CQI_{CE}$ indirectly reflects a piece of information about the impact of the activity on the network on the development in the quality indicator for the radio communication channel CQI, independently of the radio conditions affecting the receiving device M.

The two decorrelated pieces of information provided by these indicators $CQI_{CT}$ and $CQI_{CE}$ can then be used to obtain a channel quality indicator CQI that is more precise than the indicators that are usually obtained in the prior art.

In a first embodiment of this step 30 of determination of the quality indicator CQI, the principle consideration is the maximum load activity observed on the cellular network, which provides a conservative, simple and effective solution for calculating this indicator CQI.

This is done by calculating the minimum value Min[$\Delta$ $(CQI_{CE}-CQI_{CT})$] of the difference function $\Delta(CQI_{CE}-CQI_{CT})$ between the quality indicator at effective load $CQI_{CE}$ and the quality indicator at total load $CQI_{CT}$, over a sliding time window of duration T, T being a multiple of the duration of the frames transmitted in the network (for example if a frame has a duration of 1 ms, as is the case in 3GPP LTE, these measurements can be taken every k milliseconds, k being an integer greater than or equal to 1).

In particular, for a given instant n:

$$\text{Min}[\Delta(\text{CQI}_{CE}-\text{CQI}_{CT})](n)=\text{Minimum}\{\text{Min}[\Delta(\text{CQI}_{CE}-\text{CQI}_{CT})](n-1), \text{CQI}_{CE}(n)-\text{CQI}_{CT}(n)\}.$$

In this first embodiment, the quality indicator for the radio transmission channel $CQI_1$ is then determined, at a given instant n, as being the sum of the quality indicator for the channel at total load $CQI_{CT}$ and this minimum value.

In other words, $CQI_1(n)=CQI_{CT}(n)+\text{Min}[\Delta(CQI_{CE}-CQI_{CT})](n)$

This quality indicator for the radio transmission channel $CQI_1$ can then be used by the transmitting device $NB_1$ to adapt the transmission speed on the downlink, according to techniques that are known to a person skilled in the art and that will not be discussed in detail here.

FIG. 3B illustrates the development over time in the quality indicator for the radio transmission channel $CQI_1$ obtained with this first embodiment of this determination step 30.

In particular, it is noted that the curve for this indicator $CQI_1$ remains continually between the two curves for the indicators $CQI_{CE}$ and $CQI_{CT}$ over the window under consideration.

This indicator $CQI_1$ takes account both of the instantaneous development in the radio conditions (through its component $CQI_{CT}$) and of the mean development in the activity maxima on the network (through its component $\text{Min}[\Delta(CQI_{CE}-CQI_{CT})]$).

In a second embodiment of step 30 of determination of the quality indicator CQI, the main consideration is the mean of the difference between a maximum load activity and an effective load activity as observed on the cellular network, which provides an opportunistic and simple solution for calculating this indicator CQI.

This is done by calculating the mean value $\text{Moy}[\Delta(CQI_{CE}-CQI_{CT})]$ of the difference function $\Delta(CQI_{CE}-CQI_{CT})$ between the quality indicator at effective load $CQI_{CE}$ and the quality indicator at total load $CQI_{CT}$, over a sliding time window T as defined previously.

$$\text{Moy}[\Delta(\text{CQI}_{CE}-\text{CQI}_{CT})](n)=\text{Mean}\{\text{Moy}[\Delta(\text{CQI}_{CE}-\text{CQI}_{CT})](n-1), \text{CQI}_{CE}(n)-\text{CQI}_{CT}(n)\}.$$

In this second embodiment, the quality indicator for the channel $CQI_2$ is then determined, at a given instant n, as being the sum of the quality indicator for the channel at total load $CQI_{CT}$ and this mean value.

In other words, $CQI_2(n)=CQI_{CT}(n)+\text{Moy}[\Delta(CQI_{CE}-CQI_{CT})]$

This quality indicator for the radio transmission channel $CQI_2$ can then be used by the transmitting device $NB_1$ to adapt the transmission speed on the downlink.

FIG. 3C illustrates the development over time in the quality indicator for the channel $CQI_2$ obtained with this second embodiment of this determination step 30.

In particular, it is noted that the curve for this indicator $CQI_2$ can, at certain moments, overtake the curve for the quality indicator at effective load $CQI_{CE}$ over the window under consideration, which amounts to overestimating the quality of the radio channel at these moments.

This indicator $CQI_2$ takes account both of the instantaneous development in the radio conditions (through its component $CQI_{CT}$) and of the mean development in the activity on the network (through its component $\text{Moy}[\Delta(CQI_{CE}-CQI_{CT})]$).

Finally, in a third embodiment of step 30 of determination of the quality indicator CQI, statistical consideration is given to the difference between a maximum load activity and an effective load activity as observed on the cellular network, which provides a more effective solution in return for increased calculation complexity.

This is done by calculating the minimum value $\text{Min}[\Delta(CQI_{CE}-CQI_{CT})]$, the mean value $\text{Moy}[\Delta(CQI_{CE}-CQI_{CT})]$ and the maximum value $\text{Max}[\Delta(CQI_{CE}-CQI_{CT})]$ of the difference function $\Delta(CQI_{CE}-CQI_{CT})$ between the quality indicator at effective load $CQI_{CE}$ and the quality indicator at total load $CQI_{CT}$, over a sliding time window T as defined previously.

FIG. 3D illustrates the development over time in these three values obtained with this third embodiment of this determination step 30.

In particular, the development over time in the minimum value $\text{Min}[\Delta(CQI_{CE}-CQI_{CT})]$ and the mean value $\text{Moy}[\Delta(CQI_{CE}-CQI_{CT})]$ is respectively reflected by the curves for the quality indicators $CQ_1$ and $CQ_2$, this already having been respectively illustrated in FIGS. 3B and 3C.

The development over time in the value of the maximum value $\text{Max}[\Delta(CQI_{CE}-CQI_{CT})]$ is for its part reflected by the curve for the quality indicator $CQ_3$ such as, for a given instant n:

$$CQI_3(n)=CQI_{CT}(n)+\text{Max}[\Delta(CQI_{CE}-CQI_{CT})](n).$$

In this third embodiment, the quality indicator $CQI_4$ for the channel then takes, at a given instant n, either the value of the quality indicator $CQ_1$, or the value of the quality indicator $CQ_3$, specifically on the basis of the comparison of the quality indicator $CQ_2$ with a parameterizable threshold K, which may be at a given percentage of the difference between the maximum value $\text{Max}[\Delta(CQI_{CE}-CQI_{CT})]$ and the minimum value $\text{Min}[\Delta(CQI_{CE}-CQI_{CT})]$ at this instant n, for example.

By way of example, at the instant n, this threshold can take the following value:

$$K(n)=50\%*(\text{Max}[\Delta(\text{CQI}_{CE}-\text{CQI}_{CT})]-\text{Min}[\Delta(\text{CQI}_{CE}-\text{CQI}_{CT})]).$$

In particular, if the quality indicator $CQ_2$ is higher than this threshold K at a given instant n, then the quality indicator $CQI_4$ is determined according to the following formula:

$$CQI_4(n)=CQI_3(n)=CQI_{CT}(n)+\text{Max}[\Delta(CQI_{CE}-CQI_{CT})](n).$$

On the other hand, as soon as the quality indicator $CQ_2$ is below or equal to this threshold K, then the quality indicator $CQI_4$ is determined according to the following conservative formula:

$$CQI_4(n)=CQI_1(n)=CQI_{CT}(n)+\text{Min}[\Delta(CQI_{CE}-CQI_{CT})](n),$$

which corresponds to the first embodiment discussed previously.

FIG. 3E illustrates the development over time in the quality indicator for the radio transmission channel $CQI_4$ obtained with this third embodiment of this determination step 30.

In particular, it is notable in this figure that the quality indicator $CQI_4$ changes to a first state, in which it corresponds to the quality indicator $CQI_1$, in a situation ① corresponding to instants at which the mean value $\text{Moy}[\Delta$ ($CQI_{CE}-CQI_{CT}$)] exceeds the threshold K, whereas this quality indicator $CQI_4$ changes to a second, more conservative state, in which it corresponds to the quality indicator $CQI_3$, in a situation ② corresponding to instants at which the mean value $Moy[\Delta(CQI_{CE}-CQI_{CT})]$ is below, or equal to, this threshold K.

This indicator $CQI_4$ therefore takes account both of the instantaneous development in the radio conditions through its component $CQI_{CT}$, and of the probability of having a high or low level of activity on the network when compared with a reference activity threshold, through a second component, which may be either the minimum value $Min[\Delta(CQI_{CE}-CQI_{CT})]$, or the maximum value $Max[\Delta(CQI_{CE}-CQI_{CT})]$.

The determination of the quality indicator CQI can be carried out at the receiving device M or at the transmitting device $NB_1$, according to the constraints and the application context of the present invention.

Figure 4A:
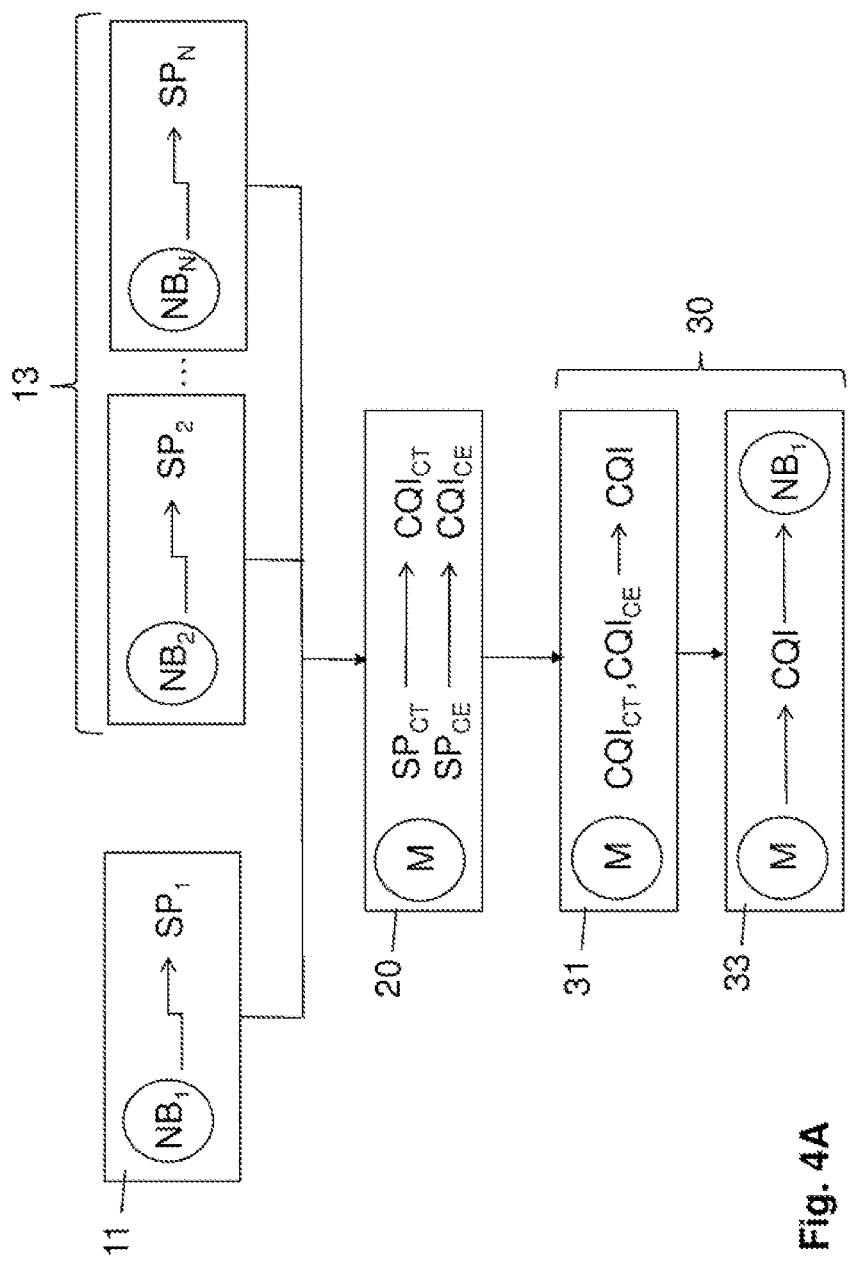
FIGS. 4A to 4B respectively illustrate the steps of a method for establishing a quality indicator CQI and a cellular network in which this method is implemented according to a first embodiment of the present invention.

FIG. 4A thus illustrates the steps of a method for establishing the quality indicator CQI according to a first embodiment of the present invention in which this determination is carried out at the receiving device M.

In this first embodiment, the quality indicator CQI for the radio transmission channel is deduced by the receiving device M from the quality indicators $CQI_{CT}$ and $CQI_{CE}$ (step 31), and then transmitted to the first transmitting device $NB_1$ (step 33) so that the latter is able to adapt the transmission speed on the basis of this indicator CQI.

This first embodiment is advantageous in that it is transparent to the transmitting device $NB_1$, since the latter receives a channel quality indicator CQI that is similar to the indicators that are usually used in the prior art, and is therefore able to be used with traditional base stations, without modifying the link adaptation process of the latter.

Figure 4B:
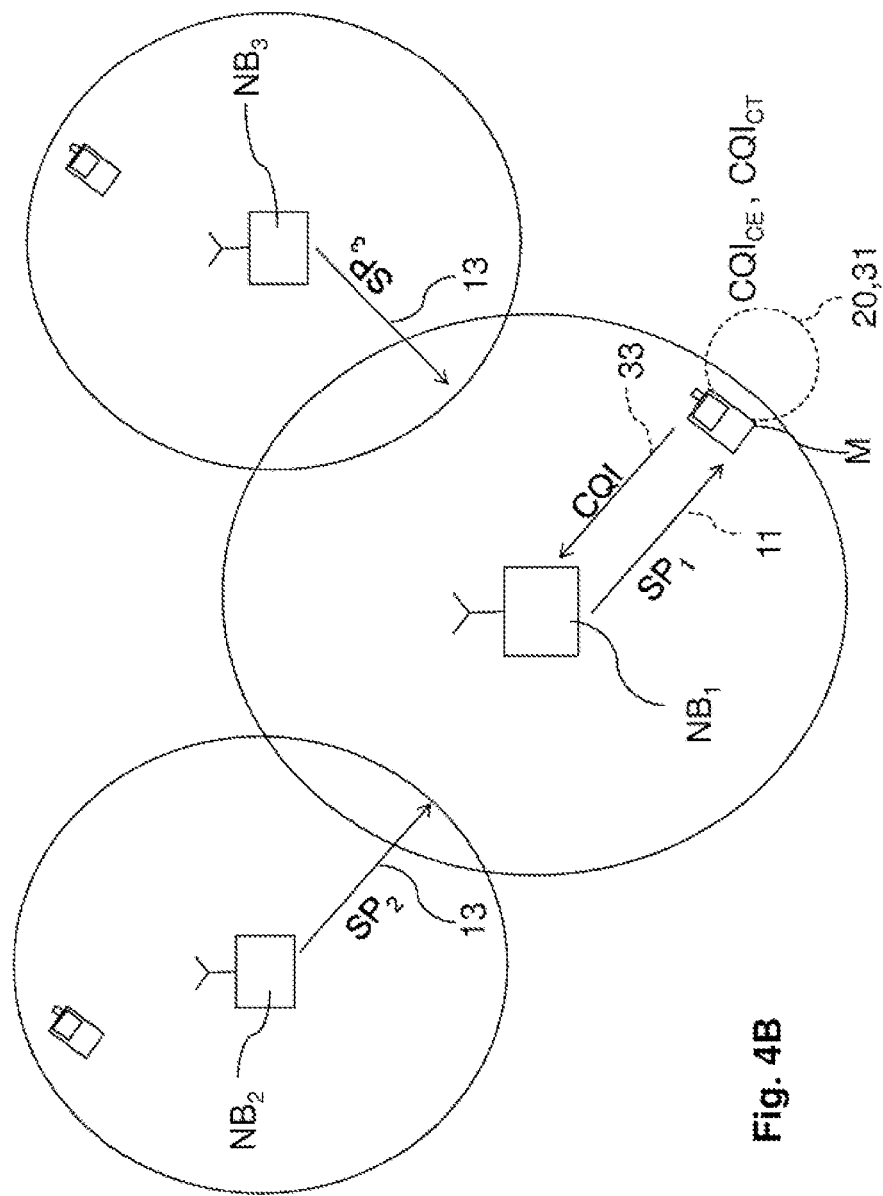

FIG. 4B illustrates the cellular network in which the method according to the first embodiment of the present invention is implemented.

It can readily be seen in this figure that the measurement of the quality indicators $CQI_{CT}$ and $CQI_{CE}$ (step 20) and the deduction of the quality indicator CQI from these indicators (step 31) are implemented at the receiving device M.

To do this, the receiving device M comprises a receiving module (for example a radio antenna) that is capable of receiving the reference pilot signal $SP_1$ transmitted by the base station $NB_1$, a processing module (typically comprising a processor associated with a random access memory) configured to implement the steps of measurement of the quality indicators at total load $CQI_{CT}$ and at effective load $CQI_{CE}$ and of determination of the quality indicator for the channel CQI from these indicators $CQI_{CT}$ and $CQI_{CE}$, as described previously, and a transmitting module (for example a radio antenna) for transmitting the quality indicator for the channel CQI to the base station $NB_1$.

The base station $NB_1$, for its part, comprises a transmitting module (typically a radio antenna) configured to transmit, to the mobile terminal M, the reference pilot signal $SP_1$ and a receiving module (typically a radio antenna) that is capable of reciprocally receiving the quality indicator for the channel CQI that is calculated and transmitted by the mobile terminal M. The other base stations $NB_2$ and $NB_3$, for their part, each comprise a transmitting module (typically a radio antenna) configured to transmit, in their respective cells, an interfering pilot signal $SP_2$ as described above.

Figure 5A:
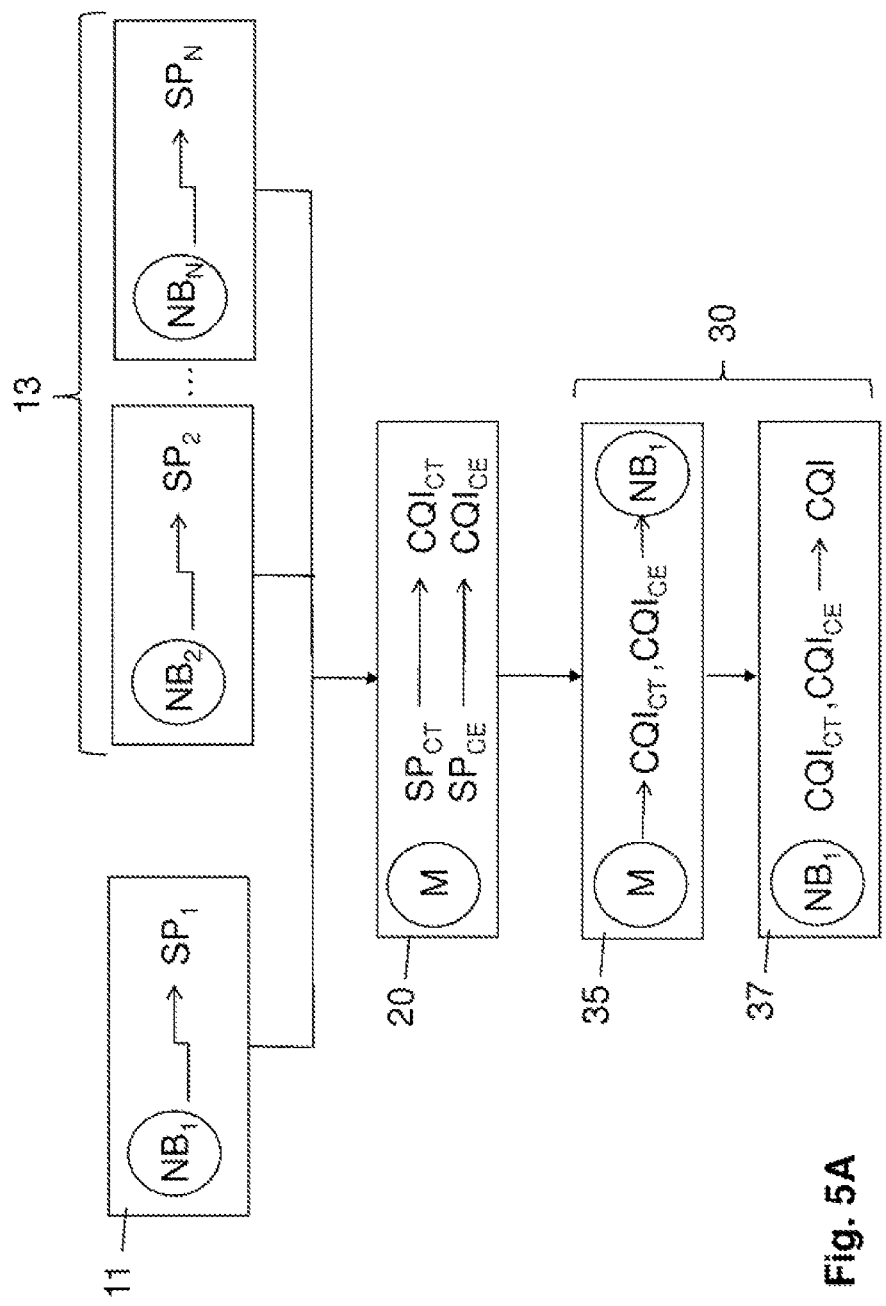
FIGS. 5A and 5B respectively illustrate the steps of a method for establishing a quality indicator CQI and a cellular network in which this method is implemented according to a second embodiment of the present invention.

FIG. 5A illustrates the steps of a method for establishing the quality indicator CQI according to a second embodiment of the present invention in which this determination is carried out, in this case, at the transmitting device $NB_1$.

In this second embodiment, the quality indicators $CQI_{CT}$ and $CQI_{CE}$ are first of all transmitted (step 35) by the receiving device M to the transmitting device $NB_1$, before this transmitting device $NB_1$ starts to deduce the quality indicator CQI from these quality indicators $CQI_{CT}$ and $CQI_{CE}$ (step 37).

This second embodiment is particularly advantageous in that it allows limitation of the calculation resources that are necessary at the receiving device M, since the calculation of the quality indicator CQI is this time carried out at the transmitting device $NB_1$, which usually has greater computation capabilities (this is particularly the case of a network with base stations communicating with portable terminals of mobile telephone type).

Moreover, this embodiment has the advantage of being more progressive insofar as it is easier for the operators to update the transmitting devices, belonging to their networks, than the receiving devices, which are much more numerous and inhomogeneous.

Figure 5B:
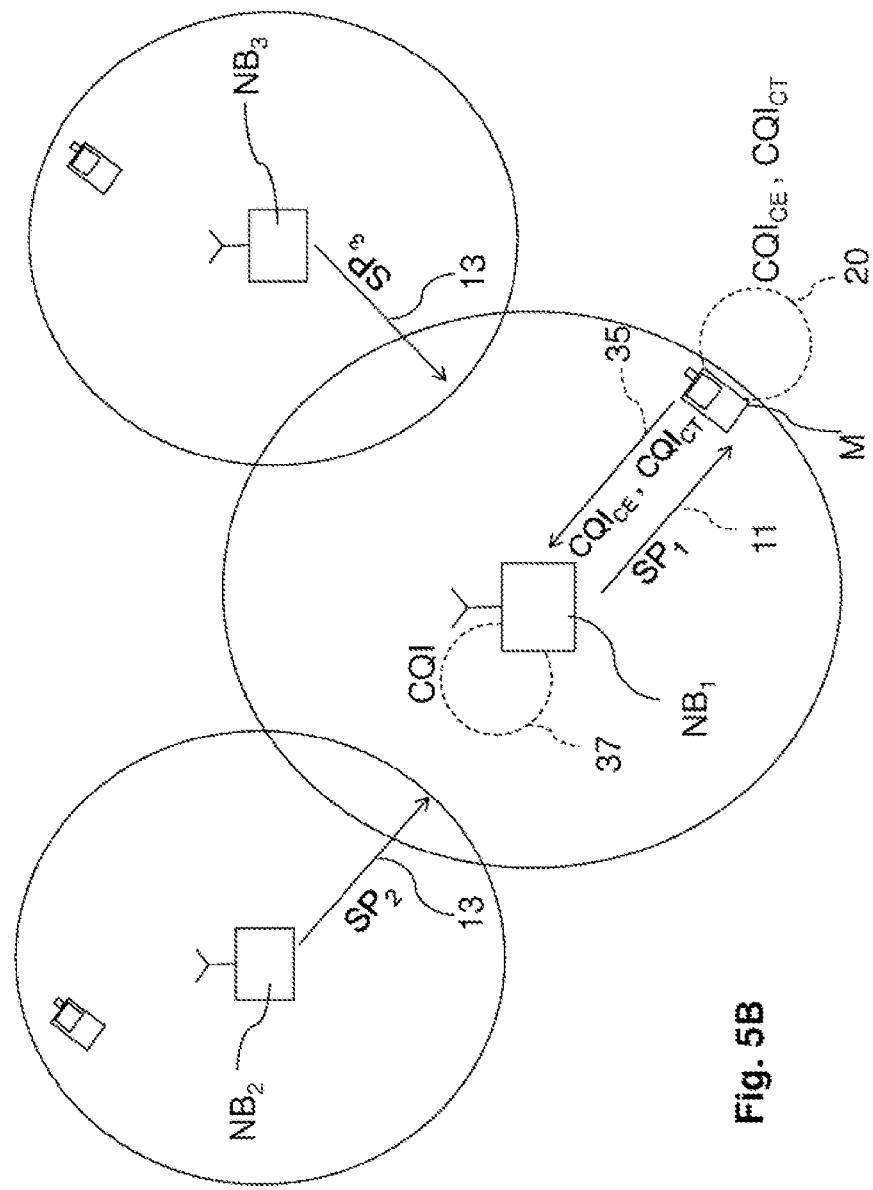

FIG. 5B illustrates the cellular network in which the method according to the second embodiment of the present invention is implemented.

It can readily be seen in this figure that only the measurement of the quality indicators $CQI_{CT}$ and $CQI_{CE}$ is carried out at the receiving device M (step 20), the deduction of the quality indicator CQI from these indicators being carried out at the transmitting device $NB_1$ (step 37).

To do this, the base station $NB_1$ comprises a transmitting module (typically a radio antenna) configured to transmit to the mobile terminal M the reference pilot signal $SP_1$ and a receiving module (typically a radio antenna) that is capable of reciprocally receiving the quality indicators $CQI_{CT}$ and $CQI_{CE}$ that are calculated and transmitted by the mobile terminal M. Moreover, the base station $NB_1$ comprises a processing module (typically comprising a processor associated with a random access memory) that is configured to implement the step of determination of the quality indicator for the channel CQI from these indicators $CQI_{CT}$ and $CQI_{CE}$. The other base stations $NB_2$ and $NB_3$, for their part, each comprise a transmitting module (typically a radio antenna) that is configured to transmit, in their respective cells, an interfering pilot signal $SP_2$ as described above.

The receiving device M, for its part, comprises a receiving module (for example a radio antenna) that is capable of receiving the reference pilot signal $SP_1$ transmitted by the base station $NB_1$, a processing module (typically comprising a processor associated with a random access memory) that is configured to implement the step of measurement of the quality indicators at total load $CQI_{CT}$ and at effective load $CQI_{CE}$ as described previously, and a transmitting module (for example a radio antenna) for transmitting these quality indicators $CQI_{CT}$ and $CQI_{CE}$ to the base station $NB_1$.

Reference is now made to FIGS. 6A to 6D, which illustrate a reference pilot signal $SP_1$, as transmitted by a first transmitting device situated in a first cell of a cellular network, and an interfering pilot signal $SP_2$, as transmitted by a second transmitting device situated in a cell adjacent to the first cell in the cellular network, which are represented according to one and the same two-dimensional time and frequency block.

Figure 6D:
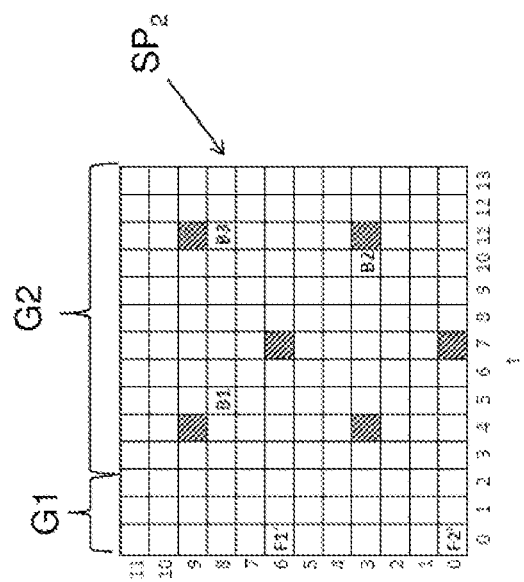
FIG. 6D illustrates an interfering pilot signal according to the principle of the present invention, as transmitted by a second transmitting device situated in a cell that is adjacent to the first cell in the cellular network, represented according to the same two-dimensional time and frequency block.
Figure 6A:
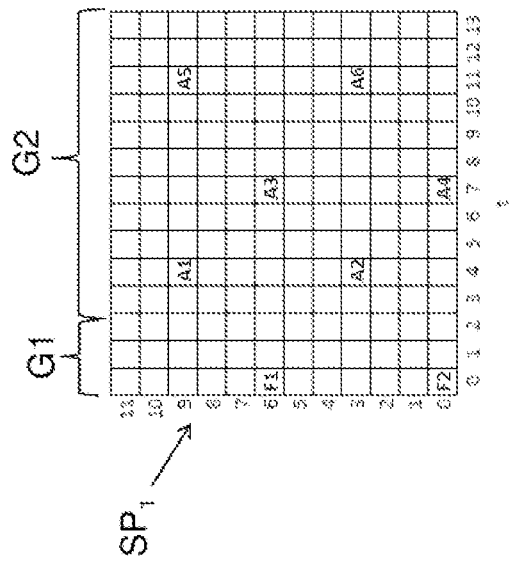

In particular, FIG. 6A illustrates a reference pilot signal $SP_1$ transmitted by the first transmitting device $NB_1$ situated in the first cell of the cellular network illustrated in FIG. 1.

This pilot signal is represented according to a two-dimensional time and frequency block defined by 12 sub-carriers $f_0$ to $f_{11}$ (ordinate axis) and 14 intervals of symbol times from (t=0) to (t=13) (abscissa axis).

This reference pilot signal $SP_1$ particularly comprises two total load pilot symbols $F_1$ and $F_2$, and six effective load pilot symbols $A_1$ to $A_6$, in this nonlimiting example.

The total load pilot symbols $F_1$, $F_2$ are situated in an area G1 of the two-dimensional block that is dedicated to the transmission of symbols other than data symbols in the strict sense, such as signaling or control symbols. Thus, these total load pilot symbols $F_1$, $F_2$ cannot be interfered with by data symbols transmitted in other adjacent cells.

In this case, this area G1 typically corresponds to the preamble reserved for control symbols. Thus, in a network based on the 3GPP LTE standard, this area G1 corresponds to the preamble reserved for symbols called PDCCH that are transmitted during a first interval $[t_{11}, t_{12}]$ covering the 1, 2, or 3 first symbol times (according to the configuration of the PDCCH) of the frames transmitted by the transmitting devices $NB_1$, $NB_2$, etc.

The effective load pilot symbols $A_1$ to $A_6$, for their part, are placed in an area G2 of the two-dimensional time and frequency block that is dedicated to the transmission of data symbols in the strict sense. Thus, these effective load pilot symbols can be interfered with only by data symbols transmitted in other adjacent cells.

In this case, this area G2 typically corresponds to the resource block, or "payload" field, reserved for data symbols during the last symbol times of the frames transmitted by the transmitting devices $NB_1$, $NB_2$, etc.

Figures 6B, 6C:
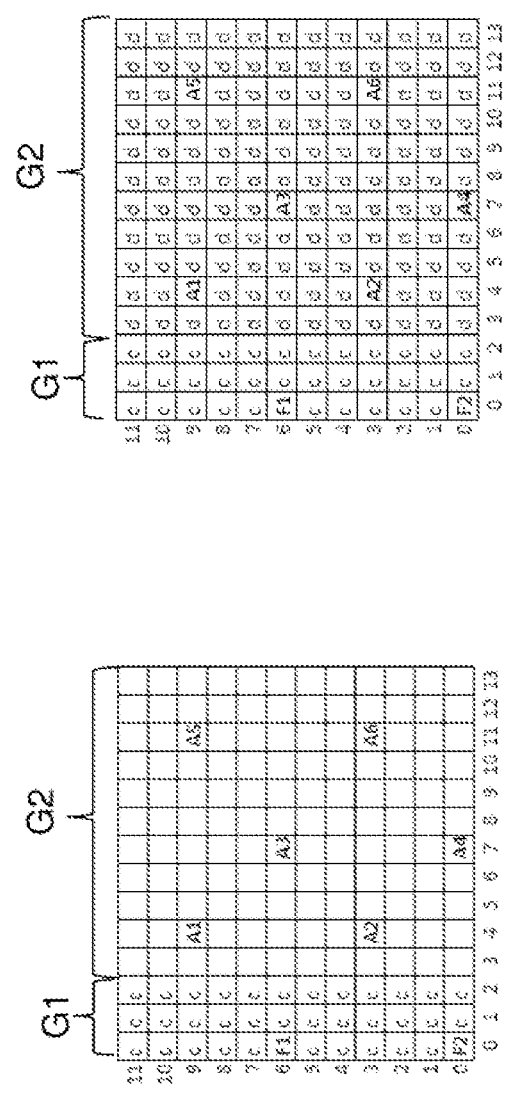

FIG. 6B illustrates the two-dimensional time and frequency block when the area G1 is completely loaded and the resource block G2 is empty. In such a situation, the area G1 of this block is completely filled with PDCCH symbols (denoted by "c"), with the exception of the total load pilot symbols $F_1$ et F2 belonging to the total load pilot signal $SP_{CT}$. In the area G2, only the effective load pilot symbols A1 to A6 appear.

FIG. 6C illustrates the two-dimensional time and frequency block when the area G1 is completely loaded and the resource block G2 is likewise completely loaded. In such a situation, the area G1 of this two-dimensional block is completely filled with PDCCH symbols (denoted by "c"), with the exception of the total load pilot symbols F1 and F2, and the resource block G2 is completely filled with data symbols (denoted by "d"), with the exception of the effective load pilot symbols A1 to A6 belonging to the effective load pilot signal $SP_{CE}$.

FIG. 6D illustrates an interfering pilot signal $SP_2$ transmitted by the second transmitting device $NB_2$ situated in the second cell of the cellular network illustrated in FIG. 1.

This interfering pilot signal $SP_2$ comprises two interfering pilot symbols F'1, F'2, situated in the area G1 of the two-dimensional time and frequency block, and three other interfering symbols B1 to B3 situated in the area G2 of the two-dimensional time and frequency block.

The interfering pilot symbols F'1, F'2 are particularly placed in the same position, in this two-dimensional block, as the total load pilot symbols F1, F2 in FIG. 6A for the reference pilot signal $SP_1$ transmitted by the transmitting device $NB_1$, so as to interfere with this reference pilot signal. In other words, the transmitting device $NB_2$ transmits an interfering pilot signal in which symbols F'1 and F'2 modulate the same subcarriers (in this case the first and seventh subcarriers $f_0$ and $f_6$) as those that are modulated by the symbols F1 and F2, in the reference pilot signal $SP_1$, specifically during the same first symbol time (in this case the first symbol time of the two-dimensional block for t=0).

These interfering pilot symbols F'1 and F'2 can be used to allow the transmitting device $NB_2$ to measure a total load quality indicator $CQI_{CT2}$ for the second cell, in a similar manner to what is carried out by the transmitting device $NB_1$, in which case these interfering pilot symbols can then correspond to total load pilot symbols belonging to a total load pilot signal $SP_{CT2}$, used in the second cell, on condition that these symbols F'1, F'2 are known to a receiving device that is present in the second cell so as to allow the determination of this total load quality indicator $CQI_{CT2}$ for this receiving device.

On the contrary, the three other interfering symbols B1 to B3 are placed in positions of the two-dimensional block that do not correspond to the positions of the effective load pilot symbols A1 to A6 of the reference pilot signal $SP_1$. The positions of these symbols A1 to A6 are recalled by shaded boxes in FIG. 6D.

It is actually particularly advantageous that the positions of these effective load pilot symbols A1 to A6 are kept free of any interfering pilot symbol, in the interfering pilot signals transmitted in the adjacent cells, so that only the data symbols transmitted in the adjacent cells are able to interfere with these effective load pilot symbols A1 to A6 in the cell of interest, and therefore of measurement an effective load quality indicator $CQI_{CE}$ in the cell of interest reflecting the effective load, in terms of data transmitted in the adjacent cells, as precisely as possible.

These interfering symbols B1 to B3 can likewise be used, within the second cell, to allow the transmitting device $NB_2$ to measure an effective load quality indicator $CQI_{CE2}$ for the second cell, in a similar manner to what is carried out by the transmitting device $NB_1$, in which case these interfering symbols can correspond to effective load pilot symbols belonging to an effective load pilot signal $SP_{CE2}$, from the point of view of the second cell, on condition that these symbols B1 to B3 are known to a receiving device that is present in the second cell, so as to allow the determination of this effective load quality indicator $CQI_{CE2}$ by this receiving device.

Reference is now made to a particular embodiment in which the transmitting devices $NB_j$ of adjacent cells transmit pilot signals exhibiting one and the same set of pilot symbols arranged according to one and the same pattern, in a two-dimensional time and frequency block, but frequency-shifted from one pilot signal to the other.

This other embodiment is illustrated in FIGS. 7A to 7C.

In particular, FIG. 7A again illustrates the reference pilot signal $SP_1$, transmitted by the first transmitting device $NB_1$ situated in the first cell of the cellular network illustrated in FIG. 1, as already illustrated in FIG. 6A. The pilot symbols F1, F2 and A belonging to this signal $SP_1$ are arranged according to a predetermined pattern in the two-dimensional time and frequency block.

FIG. 7B illustrates an interfering pilot signal $SP_2$, transmitted by the second transmitting device $NB_2$ situated in the second cell of the cellular network illustrated in FIG. 1, according to this other embodiment.

In this second pilot signal $SP_2$, the pilot symbols F1, F2 and A have an arrangement following the same pattern, in the two-dimensional block, as the pilot symbols of the first pilot signal $SP_1$, in return for a frequency shift in a subcarrier.

By way of example, effective load pilot symbols A modulate, during the fifth symbol time of the two-dimensional block, the fifth and eleventh orthogonal subcarriers $f_4$ and $f_{10}$ in the pilot signal $SP_2$, whereas the effective load pilot symbols A modulate, during this same fifth symbol time of the two-dimensional block, the fourth and tenth orthogonal subcarriers $f_3$ and $f_9$ in the pilot signal $SP_1$.

This pattern of pilot symbols can thus be resumed in each pilot signal $SP_j$ transmitted by each transmitting device $NB_j$ of a group of adjacent cells, by shifting the pilot symbols by one subcarrier each time.

Such a scheme of pilot signals can notably correspond to the reference signals transmitted in a cellular network of LTE (for Long Term Evolution) type.

The use of these frequency-shifted patterns makes sure of the fact that, for each pilot symbol of a pilot signal $SP_j$, no other pilot symbol of another pilot signal $SP_{k,k\neq j}$ for an adjacent cell interferes with this pilot signal. The effective load pilot symbols A, situated in the area G2 of the two-dimensional block, can therefore be interfered with only by data symbols, which allows a more reliable effective load quality indicator $CQI_{CE}$ to be obtained.

In order to bring about the interference on the total load pilot signal $SP_{CT}$ that is necessary for obtaining a reliable total load quality indicator $CQI_{CT}$, complementary pilot symbols (denoted by "ds") are added to the total load pilot signals Fi in each pilot signal $SP_j$ from the group of adjacent cells. Complementary pilot symbols of this kind may be stuffing symbols, in non-zero form, of any type.

In particular, these complementary pilot symbols ds modulate, during the symbol time(s) in which a total load pilot symbol Fi modulates one of the orthogonal subcarriers, all of the other subcarriers, among the L orthogonal subcarriers, that are not modulated by any symbols.

This makes it possible to guarantee that, at a symbol time for which the pilot signals $SP_j$ from a group of adjacent cells comprise total load pilot symbols Fi, each of the N orthogonal subcarriers is modulated by a symbol. Thus, for a given cell, each total load pilot symbol Fi is then interfered with by all of the pilot signals from the cells adjacent to this cell, which makes it possible to obtain a reliable total load quality indicator $CQI_{CT}$.

FIG. 7C illustrates an interfering pilot signal $SP_2$ comprising complementary pilot symbols of this kind.

This interfering pilot signal $SP_2$ actually comprises two total load pilot symbols F1 and F2 respectively modulating the eighth subcarrier $f_7$ and the second subcarrier $f_1$ during the first symbol time (t=0) of the two-dimensional block. This interfering pilot signal $SP_2$ moreover comprises complementary pilot symbols ds modulating the other subcarriers $f_0$, $f_2$ to $f_6$ and $f_8$ to $f_{11}$ during this same first symbol time.

This fill scheme, for a given symbol time of the area G1 of the two-dimensional block, can be repeated for all of the pilot signals $SP_1$, $SP_2$, . . . so as to guarantee that a reliable total load quality indicator $CQI_{CT}$ is obtained.

Reference is now made to another particular embodiment, similar to the previous one but distinguished therefrom in that the total load pilot symbols are modulated during separate first symbol times, however.

FIG. 8A illustrates a reference pilot signal $SP_1'$ according to this other particular embodiment, as transmitted by the first transmitting device $NB_1$ situated in the first cell of the cellular network illustrated in FIG. 1.

In particular, apart from the effective load symbols A, the reference pilot signal $SP_1'$ comprises a first total load pilot symbol F1 modulating the seventh subcarrier $f_6$ during a first symbol time (t=0) and a second total load pilot symbol F2 modulating the third subcarrier $f_2$ during a second symbol time (t=1).

FIG. 8B illustrates an interfering pilot signal $SP_2'$ that is suited to such a reference pilot signal $SP_1'$.

In particular, apart from the effective load pilot symbols A shifted by one subcarrier in relation to the effective load pilot symbols of the reference pilot signal $SP_1'$, the interfering pilot signal $SP_2'$ comprises complementary pilot symbols modulated during the first two symbol times (t=0) and (t=1).

As far as the first symbol time (t=0) is concerned, apart from the total load pilot symbol F1 modulating the eighth subcarrier $f_7$, the interfering pilot signal $SP_2'$ comprises complementary pilot symbols modulating the other subcarriers $f_0$ to $f_6$ and $f_8$ to $f_{11}$ during this same first symbol time.

As far as the second symbol time (t=1) is concerned, apart from the total load pilot symbol F2 modulating the third subcarrier $f_2$, the interfering pilot signal $SP_2'$ comprises complementary pilot symbols modulating the other subcarriers $f_0$ to $f_1$ and $f_3$ to $f_{11}$ during this same second symbol time.

The present invention moreover relates to a computer program having code instructions for implementing the method for establishing the channel quality indicator CQI described previously, and notably the step of determination of this channel quality indicator CQI from channel quality indicators at total load $CQI_{CT}$ and effective load $CQI_{CE}$, when this program is executed by a processing module of a transmitting device, as is the case in the embodiment described in FIG. 5B, or a receiving device, as is the case in the embodiment described in FIG. 4B.

A program of this type can use any programming language and be in the form of a source code, object code or intermediate code between source code and object code, as in a partially compiled form, or in any other desirable form.

The present invention also relates to an information storage medium that can be read by a data processor, and having code instructions for one of the programs mentioned above. This information storage medium may be any entity or device that is capable of storing the aforementioned program. By way of example, the medium may have a storage means, such as a ROM, for example a CD-ROM or a microelectronic circuit ROM, or else a magnetic recording means, for example a floppy disk or a hard disk. This information storage medium may likewise have FLASH type memory, for storing the program and recording information received by a client module, and RAM type memory for saving temporary data such as server lists and associated themes.

On the other hand, this information storage medium may be a transmissible medium such as an electrical or optical signal, which can be routed via an electrical or optical cable, by radio or by other means. The programs according to the invention may be particularly downloaded from a network of Internet type.

Of course, the invention is not limited to the exemplary embodiments described and represented above, on the basis of which it will be possible to anticipate other modes and other embodiments without, however, departing from the scope of the invention.

Thus, this invention applies particularly to cellular OFDM networks in FDD mode, as defined in the 3GPP-LTE, LTE-A, IEEE WiMAX Mobile (IEEE 802.16) and WiFI (IEEE 802.11) standards.

An exemplary embodiment of the present invention is therefore to resolve the problem of CQI mismatch without giving rise to the disadvantages of the prior art, notably in terms of an increase in complexity, under-optimization and loss of capacity.

The invention claimed is:

1. A method for establishing a quality indicator for a radio transmission channel in a first cell of a cellular network using a plurality of frequency-division-multiplexed orthogonal subcarriers for transmitting data, the method comprising:

transmitting, by a first transmitting device situated in the first cell, of a reference pilot signal comprising a total load pilot signal modulating at least one of said orthogonal subcarriers, during at least a first symbol time dedicated to transmission of symbols other than data symbols, and an effective load pilot signal modulating at least one of said orthogonal subcarriers during at least one second symbol time dedicated to transmission of data symbols;

for each cell adjacent to the first cell in the cellular network, transmitting, by a transmitting device situated in said adjacent cell, of an interfering pilot signal modulating, during said at least one first symbol time, during which the total load pilot signal modulates at least one of said subcarriers, said at least one subcarrier modulated by the total load pilot signal;

measuring, by a receiving device situated in the first cell, of a quality indicator for the channel at total load by taking account of the total load pilot signal and of a quality indicator for the channel at effective load by taking account of the effective load pilot signal; and determining the quality indicator for the radio transmission channel from the quality indicator for the channel at effective load and the quality indicator for the channel at total load, by calculating a minimum value, over a time window, of a difference function between the quality indicator for the channel at effective load and the quality indicator for the channel at total load, the quality indicator for the channel being determined as being a sum of the quality indicator for the channel at total load and said minimum value.

2. The method for establishing a quality indicator as claimed in claim 1, in which:

the total load pilot signal comprises at least two total load pilot symbols respectively modulating at least two subcarriers during at least one first symbol time dedicated to the transmission of symbols other than data symbols or one subcarrier during at least two first symbol times dedicated to the transmission of symbols other than data symbols; and the interfering pilot signal comprises a plurality of interfering pilot symbols among which at least two interfering pilot symbols respectively modulate, for each of the total load pilot symbols, the subcarrier modulated by said total load pilot symbol during the first symbol time in which said subcarrier is modulated by said total load pilot symbol.

3. The method for establishing a quality indicator as claimed in claim 1, in which the interfering pilot signal does not modulate, during said at least one second symbol time during which the effective load pilot signal modulates at least one of said subcarriers, said at least one subcarrier modulated by the effective load pilot signal.

4. The method for establishing a quality indicator as claimed in claim 3, in which:

the effective load pilot signal comprises at least two effective load pilot symbols respectively modulating at least two subcarriers during at least one second symbol time dedicated to the transmission of data symbols or one subcarrier during at least two second symbol times dedicated to the transmission of data symbols, and the interfering pilot signal does not contain a symbol modulating, during said at least one second symbol time during which an effective load pilot symbol modulates one of said subcarriers, said subcarrier modulated by the effective load pilot symbol.

5. The method for establishing a quality indicator as claimed in claim 4, in which the pilot symbols of the reference pilot signal are arranged according to a first predetermined pattern in a two-dimensional time/frequency block, and where, in each of said adjacent cells:

the interfering pilot signal comprises a plurality of pilot symbols arranged according to said predetermined pattern and frequency-shifted in relation to the pilot symbols of the reference pilot signal; and the interfering pilot signal moreover comprises a plurality of complementary pilot symbols respectively modulating, during each first symbol time during which a total load pilot symbol modulates a subcarrier, all of the subcarriers, among the plurality of orthogonal subcarriers, that are not modulated by any symbol.

6. The method for establishing a quality indicator as claimed in claim 1, in which the determination of the quality indicator for the radio transmission channel is carried out in the first transmitting device ($NB_1$), the method moreover comprising transmitting the quality indicator for the channel at total load and of the quality indicator for the channel at effective load from the receiving device to the first transmitting device.

7. The method for establishing a quality indicator as claimed in claim 1, in which the determination of the quality indicator for the radio transmission channel is carried out in the receiving device, the method moreover comprising transmitting the quality indicator from the receiving device to the first transmitting device.

8. The method for establishing a quality indicator as claimed in claim 1, in which the transmitting devices of the first cell and of the adjacent cells are base stations and the receiving device is a mobile terminal.

9. A base station for establishing a quality indicator for a radio transmission channel with at least one mobile terminal, the base station being configured to transmit data by means of a plurality of frequency-division-multiplexed orthogonal subcarriers and comprising:

a transmitting module configured to transmit, to the mobile terminal, a reference pilot signal comprising a total load pilot signal modulating at least one of said orthogonal subcarriers, during at least one first symbol time dedicated to the transmission of symbols other than data symbols, and an effective load pilot signal modulating at least one of said orthogonal subcarriers during at least one second symbol time dedicated to the transmission of data symbols;

the total load pilot signal and effective load pilot signal being configured to be used by the mobile terminal to respectively measure a quality indicator at total load and a quality indicator at effective load that are configured to be used to determine the quality indicator;

a reception module configured to receive at least one of said quality indicator, quality indicator at total load and the quality indicator at effective load; and a processing module configured to determine the quality indicator by means of the quality indicator at effective load and the quality indicator at total load by performing a calculation selected from the group consisting of:

calculating a minimum value, over a time window, of a difference function between the quality indicator for the channel at effective load and the quality indicator for the channel at total load, the quality indicator for the channel being determined as being a sum of the quality indicator for the channel at total load and said minimum value;

calculating a mean value, over a time window, of a difference function between the quality indicator for the channel at effective load and the quality indicator for the channel at total load, the quality indicator for the channel being determined as being a sum of the quality indicator for the channel at total load and said mean value; and calculating a minimum value, of the mean value and of the maximum value, over a time window, of a difference function between the quality indicator for the channel at effective load, the quality indicator for the channel being determined as being a sum of the quality indicator for the channel at total load and a second variable, said second variable being chosen as being equal to said minimum value or said maximum value on the basis of the comparison of the mean value with a threshold.

10. A mobile terminal for establishing a quality indicator for a radio transmission channel with a base station that is configured to transmit data by means of a plurality of frequency-division-multiplexed orthogonal subcarriers and comprising:

a receiving module that is configured to receive, from said base station, a reference pilot signal comprising a total load pilot signal modulating at least one of said orthogonal subcarriers, during at least one first symbol time dedicated to transmission of symbols other than data symbols, and an effective load pilot signal modulating at least one of said orthogonal subcarriers during at least one second symbol time dedicated to transmission of data symbols; and a processing module configured to measure a quality indicator at total load by means of the total load pilot signal and a quality indicator at effective load by means of the effective load pilot signal, and determine the quality indicator by performing a calculation selected from the group consisting of:

calculating a minimum value, over a time window, of a difference function between the quality indicator for the channel at effective load and the quality indicator for the channel at total load, the quality indicator for the channel being determined as being a sum of the quality indicator for the channel at total load and said minimum value;

calculating a mean value, over a time window, of a difference function between the quality indicator for the channel at effective load and the quality indicator for the channel at total load, the quality indicator for the channel being determined as being a sum of the quality indicator for the channel at total load and said mean value; and calculating a minimum value, of the mean value and of the maximum value, over a time window, of a difference function between the quality indicator for the channel at effective load, the quality indicator for the channel being determined as being a sum of the quality indicator for the channel at total load and a second variable, said second variable being chosen as being equal to said minimum value or said maximum value on the basis of the comparison of the mean value with a threshold.

11. A mobile terminal for establishing a quality indicator as claimed in claim 10, further comprising a transmission module configured to transmit the quality indicator to the base station.

12. A method for establishing a quality indicator for a radio transmission channel in a first cell of a cellular network using a plurality of frequency-division-multiplexed orthogonal subcarriers for transmitting data, the method comprising:

transmitting, by a first transmitting device situated in the first cell, of a reference pilot signal comprising a total load pilot signal modulating at least one of said orthogonal subcarriers, during at least a first symbol time dedicated to transmission of symbols other than data symbols, and an effective load pilot signal modulating at least one of said orthogonal subcarriers during at least one second symbol time dedicated to transmission of data symbols;

for each cell adjacent to the first cell in the cellular network, transmitting, by a transmitting device situated in said adjacent cell, of an interfering pilot signal modulating, during said at least one first symbol time, during which the total load pilot signal modulates at least one of said subcarriers, said at least one subcarrier modulated by the total load pilot signal;

measuring, by a receiving device situated in the first cell, of a quality indicator for the channel at total load by taking account of the total load pilot signal and of a quality indicator for the channel at effective load by taking account of the effective load pilot signal; and determining the quality indicator for the radio transmission channel from the quality indicator for the channel at effective load and the quality indicator for the channel at total load, by calculating a mean value, over a time window, of a difference function between the quality indicator for the channel at effective load and the quality indicator for the channel at total load, the quality indicator for the channel being determined as being a sum of the quality indicator for the channel at total load and said mean value.

13. The method for establishing a quality indicator as claimed in claim 12, in which:

the total load pilot signal comprises at least two total load pilot symbols respectively modulating at least two subcarriers during at least one first symbol time dedicated to the transmission of symbols other than data symbols or one subcarrier during at least two first symbol times dedicated to the transmission of symbols other than data symbols; and the interfering pilot signal comprises a plurality of interfering pilot symbols among which at least two interfering pilot symbols respectively modulate, for each of the total load pilot symbols, the subcarrier modulated by said total load pilot symbol during the first symbol time in which said subcarrier is modulated by said total load pilot symbol.

14. The method for establishing a quality indicator as claimed in claim 12, in which the determination of the quality indicator for the radio transmission channel is carried out in the first transmitting device ($NB_1$), the method moreover comprising transmitting the quality indicator for the channel at total load and of the quality indicator for the channel at effective load from the receiving device to the first transmitting device.

15. The method for establishing a quality indicator as claimed in claim 12, in which the determination of the quality indicator for the radio transmission channel is carried out in the receiving device, the method moreover comprising transmitting the quality indicator from the receiving device to the first transmitting device.

16. The method for establishing a quality indicator as claimed in claim 12, in which the transmitting devices of the first cell and of the adjacent cells are base stations and the receiving device is a mobile terminal.

17. A method for establishing a quality indicator for a radio transmission channel in a first cell of a cellular network using a plurality of frequency-division-multiplexed orthogonal subcarriers for transmitting data, the method comprising:
   transmitting, by a first transmitting device situated in the first cell, of a reference pilot signal comprising a total load pilot signal modulating at least one of said orthogonal subcarriers, during at least a first symbol time dedicated to transmission of symbols other than data symbols, and an effective load pilot signal modulating at least one of said orthogonal subcarriers during at least one second symbol time dedicated to transmission of data symbols;
   for each cell adjacent to the first cell in the cellular network, transmitting, by a transmitting device situated in said adjacent cell, of an interfering pilot signal modulating, during said at least one first symbol time, during which the total load pilot signal modulates at least one of said subcarriers, said at least one subcarrier modulated by the total load pilot signal;
   measuring, by a receiving device situated in the first cell, of a quality indicator for the channel at total load by taking account of the total load pilot signal and of a quality indicator for the channel at effective load by taking account of the effective load pilot signal; and
   determining the quality indicator for the radio transmission channel from the quality indicator for the channel at effective load and the quality indicator for the channel at total load, by calculating a minimum value, a mean value and a maximum value, over a time window, of a difference function between the quality indicator for the channel at effective load, the quality indicator for the channel being determined as being the a sum of the quality indicator for the channel at total load and a second variable, said second variable being chosen as being equal to said minimum value or said maximum value on the basis of the comparison of the mean value with a threshold.

18. The method for establishing a quality indicator as claimed in claim 17, in which:
   the total load pilot signal comprises at least two total load pilot symbols respectively modulating at least two subcarriers during at least one first symbol time dedicated to the transmission of symbols other than data symbols or one subcarrier during at least two first symbol times dedicated to the transmission of symbols other than data symbols; and
   the interfering pilot signal comprises a plurality of interfering pilot symbols among which at least two interfering pilot symbols respectively modulate, for each of the total load pilot symbols, the subcarrier modulated by said total load pilot symbol during the first symbol time in which said subcarrier is modulated by said total load pilot symbol.

19. The method for establishing a quality indicator as claimed in claim 17, in which the determination of the quality indicator for the radio transmission channel is carried out in the first transmitting device ($NB_1$), the method moreover comprising transmitting the quality indicator for the channel at total load and of the quality indicator for the channel at effective load from the receiving device to the first transmitting device.

20. The method for establishing a quality indicator as claimed in claim 17, in which the determination of the quality indicator for the radio transmission channel is carried out in the receiving device, the method moreover comprising transmitting the quality indicator from the receiving device to the first transmitting device.

21. The method for establishing a quality indicator as claimed in claim 17, in which the transmitting devices of the first cell and of the adjacent cells are base stations and the receiving device is a mobile terminal.

* * * * *